(12) United States Patent
Beshai et al.

(10) Patent No.: US 7,756,959 B1
(45) Date of Patent: Jul. 13, 2010

(54) SELF-PROVISIONING NODE AND NETWORK

(75) Inventors: Maged E. Beshai, Ottawa (CA); Francois J. Blouin, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1164 days.

(21) Appl. No.: 10/738,895

(22) Filed: Dec. 17, 2003

(51) Int. Cl.
*G06F 15/173* (2006.01)

(52) U.S. Cl. .......................... 709/223; 370/200
(58) Field of Classification Search .......... 709/223; 370/200
See application file for complete search history.

(56) References Cited

U.S. PATENT DOCUMENTS

| | | | | |
|---|---|---|---|---|
| 4,295,198 | A * | 10/1981 | Copeland et al. | 382/144 |
| 5,978,357 | A * | 11/1999 | Charny | 370/231 |
| 6,069,947 | A * | 5/2000 | Evans et al. | 379/229 |
| 6,442,615 | B1 * | 8/2002 | Nordenstam et al. | 709/241 |
| 6,912,203 | B1 * | 6/2005 | Jain et al. | 370/252 |
| 6,917,586 | B1 * | 7/2005 | Mauger et al. | 370/230 |
| 7,028,228 | B1 * | 4/2006 | Lovy et al. | 714/57 |
| 7,342,897 | B1 * | 3/2008 | Nader et al. | 370/255 |
| 2002/0044651 | A1 * | 4/2002 | Tuvell | 380/37 |
| 2002/0075862 | A1 * | 6/2002 | Mayes | 370/360 |
| 2003/0018719 | A1 * | 1/2003 | Ruths et al. | 709/205 |
| 2003/0033253 | A1 * | 2/2003 | Rhodes | 705/52 |
| 2004/0066785 | A1 * | 4/2004 | He et al. | 370/395.21 |

FOREIGN PATENT DOCUMENTS

EP 1043912 A2 * 10/2000
GB 2330034 A * 4/1999

OTHER PUBLICATIONS

Liu et al., "MARSHNet, a superimposed QoS guaranteed virtual path network", Global Telecommunications Conference, 1998. GLOBECOM 98. The Bridge to Global Integration. IEEE vol. 1, Nov. 8-12, 1998 pp. 7-12 vol. 1.*
Issacs et al., "Support for resource-assured and dynamic virtual private networks", Selected Areas in Communications, IEEE Journal on vol. 19, Issue 3, Mar. 2001 pp. 460-472.*
Afek et al., ("Phantom: a simple and effective flow control scheme"), Computer Networks, 2000, pp. 277-305.*

* cited by examiner

*Primary Examiner*—Vivek Srivastava
*Assistant Examiner*—William J Goodchild
(74) *Attorney, Agent, or Firm*—Anderson Gorecki & Manaras LLP

(57) ABSTRACT

An operating network comprising a large number of nodes interconnected by links determines potential link-capacity enhancement with the help of a companion phantom network. In one embodiment, the operating network and the phantom network are topologically coincident and each node participates in seeking an actual-connection setup through the operating network and a phantom connection through the phantom network for each connection request. Each node associates with each of its output links an operating capacity, a phantom capacity, an operating vacancy, and a phantom vacancy. The phantom vacancy data is used for link provisioning. In another embodiment, nodes may be added to or deleted from the operating network and the phantom network may not topologically coincide with the operating network. Each node then participates in operating connections setup while a plurality of provisioning servers are provided to perform phantom connection setup through the phantom network and determine utilization statistics for provisioning purposes.

28 Claims, 23 Drawing Sheets

*FIG. 22*

| Zone II Node | Originating Link | Originating Link | Originating Link | Originating Link |
|---|---|---|---|---|
| 1820J | 1820B $\chi_B$ $\theta_B$ | 1820R $\chi_R$ $\theta_R$ | 1820K $\chi_K$ $\theta_K$ | |
| 1820K | 1820C $\chi_C$ $\theta_C$ | 1820J $\chi_J$ $\theta_J$ | 1820R $\chi_R$ $\theta_R$ | 1820S $\chi_S$ $\theta_S$ |
| 1820S | 1820C $\chi_C$ $\theta_C$ | 1820K $\chi_K$ $\theta_K$ | 1820T $\chi_T$ $\theta_T$ | 1820F $\chi_F$ $\theta_F$ |
| 1820T | 1820S $\chi_S$ $\theta_S$ | 1820G $\chi_G$ $\theta_G$ | 1820U $\chi_U$ $\theta_U$ | |
| 1920Y | 1820W $\chi_W$ $\theta_W$ | 1820T $\chi_T$ $\theta_T$ | 1920X $\chi_X$ $\theta_X$ | 1920Y $\chi_Y$ $\theta_Y$ |

SELF-PROVISIONING NODE AND NETWORK

FIELD OF THE INVENTION

The present invention relates to telecommunications networks, and in particular to a network adapted for fully-automated capacity provisioning.

BACKGROUND

Network Basics

In its simplest form, a telecommunication network may be viewed as a set of nodes interconnected by links. A node that directly supports traffic sources and traffic sinks is an edge node. A node that does not directly support traffic sources or traffic sinks is a core node. Edge nodes may be linked to each other directly, or through core nodes. An edge node has ingress ports that receive signals from traffic sources, egress ports that transmit signals to traffic sinks, outbound ports that transmit signals to core nodes and other edge nodes, and inbound ports that receive signals from core nodes or other edge nodes. When a first edge node sends a signal to a second edge node, the first edge node is referenced as a source node and the second edge node is referenced as a sink node; an edge node functions as a source node and a sink node. A source node of a first edge node and a sink node of a second edge node define a node pair. A node pair is directional, so that the source node of the second edge node and the sink node of the first edge node define another node pair. The traffic of a node pair can be divided into multiple traffic streams that use different routes from the source node to the sink node.

The Network Provisioning Problem

Since the inception of the telephone network in the nineteenth century, and the subsequent development of computer networks, network designers and planners have struggled with what appears to be a trivial problem, namely the problem of determining the required nodal and link capacities to serve a community of users. A user, human or machine, functions as traffic source and traffic sink.

Presently, an electronic edge node or an electronic core node can be designed to scale from a capacity of a small number of ports supporting digital signals of megabits per second to a capacity of thousands of ports supporting digital signals of tens of terabits per second. Likewise, an optical core node can scale to a high capacity. Optical links, each supporting multiple wavelength channels with each channel modulated at some 10 Gb/s and having a high distance reach are available. All these network ingredients, supplemented with impressive advances in digital computing, provide a powerful means for designing a network of any geographic and topological coverage. Numerous computer-aided network design and planning tools that use computationally-intensive methods for efficient network provisioning were developed and commercialized. These tools still require manual input.

Network-Design Requirements

The simplest way to realize full connectivity is to connect each edge node with each other edge node by a link of appropriate capacity. This solution is not, however, economically feasible due to the wide variation of traffic intensities of the traffic streams, which can vary for example from a 1 Mb/s to a 100 Gb/s per stream, with the majority of traffic streams being typically of very low intensity each. This necessitates numerous links that would be used well below capacity. In addition, the spatial distribution of the traffic demand can vary significantly with time. For these reasons, almost all networks are partially connected and rely on route sharing and tandem switching to realize the required connectivity, where any edge node can send a signal to any other edge node directly, through core nodes, or through intermediate switching at other edge nodes.

The simplest route-sharing network is a star network having a central core node to which all edge nodes in the network connect. A path from one edge node (source node) to another edge node (sink node) is created by switching, at the core node, an upstream channel from the source node to a downstream channel connecting the core node to the sink node. Such a network is very simple to provision but is very limited in geographic coverage. Creating such a network to cover North America, for example, would require placing a core node of a very-high capacity somewhere in the center of the continent and providing links from the rest of the continent to the central core node. Such links would be unduly long and their cost would be prohibitive.

A composite-star network comprising several star networks interconnected at the edge but having separate and independent core nodes also requires very simple provisioning. The architecture and control of a composite-star network is described in Applicant's U.S. Pat. No. 6,570,872, issued on May 27, 2003 to Beshai et al. and titled "Self-configuring distributed switch", the specification of which is incorporated herein by reference. The composite-star network significantly extends the geographic coverage of the basic star network but may be insufficient for global world-wide coverage. A number of composite star networks of different capacities and possibly non-uniform structure can be combined in a multi-dimensional structure that scales to a coverage of billions of nodes with a total capacity of the order of a yottabit per second ($10^{24}$ bits per second), which is several orders of magnitude higher than the capacity of the current Internet. The multi-dimensional network significantly simplifies the routing function which, in turn, simplifies the resource-provisioning process.

An efficient wide-coverage high capacity network that uses a plurality of uniform composite-star networks is described in Applicant's U.S. patent application Ser. No. 09/624,079 filed on Jul. 24, 2000, and titled "Multi-dimensional Lattice Network". A uniform composite-star network requires that all edge nodes be of comparable capacity. Relaxing this strict requirement can be realized by appropriate structural and routing considerations. Applicant's U.S. patent application Ser. No. 10/180,080 filed on Jun. 27, 2002, and titled "Irregular two-dimensional wide-coverage network" describes a scaleable high-capacity network that comprises several non-uniform composite-star networks interconnected by a number of lateral uniform composite-star networks, thus forming an irregular two-dimensional network. Each non-uniform composite star network comprises electronic edge nodes, possibly of significantly different capacities, interconnected by optical core nodes. The optical core nodes are not connected to each other, and each may be configured differently and have a different reach index, where the reach index of a core node is the number of edge nodes to which the core node directly connects. Provisioning a uniform composite-star network or a multi-dimensional lattice network constructed from uniform composite-star networks is a simple exercise. However, a non-uniform composite-star network and a multi-dimensional network constructed from non-uniform composite-star networks require an elaborate provisioning process.

In a general network where the internal links of the network, i.e., the links interconnecting edge and core nodes, are concatenated in a dynamic manner to form routes that are shared by a multitude of traffic streams, the network provisioning exercise can be quite complicated. Generally, network provisioning is influenced significantly by the routing method employed, and the routing method has a pronounced impact on network efficiency.

Considering the volatility of data traffic, the difficulty of data traffic characterization, the difficulty of developing appropriate mathematical models to quantify network performance, and the fast change of the spatial distribution of data traffic, a mechanized means for determining network-capacity requirements is needed.

Applicant's U.S. patent application Ser. No. 10/029,148 filed on Dec. 28, 2001 and titled "System and method for Network Control and Provisioning", describes a multi-stratum multi-timescale control system for self-governing networks. The control system provides automatic adaptation to temporal and spatial traffic changes and to network state changes. Microsecond timescale reacting through the routing function, a facet of the lowest stratum, allows a source node to choose the best available route from a sorted list of routes, and to collect information on the state of these routes. Millisecond timescale correcting through the resource allocation function, a facet of the intermediate stratum, allows the network to correct resource allocations based on requirements calculated by the routing function. Long-term provisioning through the provisioning function at the higher stratum allows the network to recommend resource augmentations, based on requirements reported by the resource allocation function. The control is implemented in the network through coordination across edge node controllers, core node controllers, and network controllers. Metrics based on automated measurements of network performance are used by the control to adjust network resources. The Routing index is collected by the routing function and is the average rank of the selected route within a route-set. The routing function also collects measurements on route constituent traffic, which quantifies traffic in each of three categories: (carried) first-class, (carried) secondary, and rejected. The Resource Allocation Index is a metric collected by the resource allocation function. It quantifies the number of failures in re-allocating resources. A provisioning method recommends appropriate link capacity increments based on the afore-mentioned constituent-traffic measurements, and based on rules provided by the network operator.

Applicant's U.S. patent application Ser. No. 10/259,433 filed on Sep. 30, 2002 and titled "Technique for Autonomous Network Provisioning" describes a technique for autonomous network provisioning based on establishing a relation between network performance indices, traffic measurements, and resource capacities. The technique provides automatic provisioning recommendations for identified critical links. The technique may be implemented in a network through collaboration across node controllers and network controllers. A method for the autonomous provisioning of a network requires that the nodes of the network collaborate to determine required additional resources. Network-state measurements comprising traffic measurements and performance measurements are used to formulate link provisioning recommendations for critical links.

The methods of the above patent applications provide effective means of realizing networks capable of autonomous provisioning. It is desirable however to investigate other means of autonomous network provisioning that are less dependent on traffic measurements and nodal collaboration.

SUMMARY

A dual routing scheme where routes are established through an operating network and a phantom network enables the acquisition of real time occupancy data to determine potential network-capacity enhancement. The phantom network and the operating network may be topologically coincident and differ only in nodal and linkage capacity allocations. The phantom network may also include planned node addition or deletion.

In accordance with an aspect of the present invention, there is provided an operating network comprising: a plurality of operating nodes; operating links interconnecting the operating nodes; and a plurality of provisioning servers. Each provisioning server is operable to: maintain an image of phantom links emanating from a subset of the operating nodes and from a subset of phantom nodes scheduled for inclusion in the operating network; receive flow-rate-allocation requirements for specified phantom links; allocate the flow-rate-allocation requirements; and maintain utilization data of the phantom links.

The image of phantom links includes a phantom capacity and phantom vacancy for each of the phantom links and the utilization is the difference between the phantom capacity and phantom vacancy.

At least one of the operating nodes is operable to: receive a connection request specifying a sink node and a flow-rate requirement; select a phantom route to the sink node; identify provisioning servers that maintain images of at least one phantom link of the specified phantom links; and communicate the flow-rate requirement and identifiers of the at least one phantom link to at least the provisioning server associated with the first of the at least one phantom link.

Each of the provisioning servers is further operable to: ascertain the availability of sufficient vacancy in the at least one phantom link; forward a description of the phantom route and the flow-rate requirement to a subsequent provisioning server if sufficient vacancy is ascertained; and send a rejection message if sufficient vacancy is not available. Each provisioning server is further operable to determine a target capacity of the each operating link based on the cumulative statistical distributions of link utilization.

In accordance with another aspect of the present invention, there is provided a method of network self provisioning for an operating network having a first set of nodes interconnected by a first set of links where selected nodes of the first set of nodes support traffic sources and sinks. The method comprises steps of: creating an image of a phantom network the phantom network comprising a second set of nodes interconnected by a second set of links; receiving connection requests at the selected nodes; executing, for each of the connection requests, an operating-connection-setup process for an operating connection through the operating network; performing, for each successful operating-connection setup, a phantom-connection setup process for a phantom connection through the phantom network; acquiring occupancy records of each link in the second set of links traversed by the phantom connection; and determining a target capacity for each link in the phantom network based on the occupancy records. The second set of nodes includes a subset of the first set of nodes and phantom nodes scheduled for future inclusion in the operating network. The target capacity is ascertained by determining a respective statistical complementary function of the occupancy records for the each link and selecting the target capacity to correspond to the occupancy value exceeded with a prescribed probability.

The method includes further steps of determining an operating route set and a phantom route set from each of the selected nodes to each other of the selected nodes. Each of the connection requests specifies a source node, a sink node, and a flow-rate-allocation requirement, both the source node and the sink node belonging to the selected nodes.

In accordance with a further aspect of the present invention, there is provided a method of network self-provisioning for a network comprising nodes interconnected by links. The method comprises steps of: associating with each link an operating capacity, a phantom capacity, an operating vacancy, and a phantom vacancy; receiving at each of selected nodes a succession of connection requests each connection request indicating a sink node and a specified flow rate; seeking for the each connection request an operating route and a phantom route to the sink node, the operating route having a sufficient operating vacancy and the phantom route having a sufficient phantom vacancy to accommodate the specified flow rate; abandoning the phantom route if the operating route is not found; recording utilization of the phantom capacity of each link traversed by the phantom route; and determining a target capacity for each of the links based on the utilization.

The step of seeking operating and phantom routes comprises further steps of associating with the each connection request a current connection request code of two digits initialized as '11'; setting a response code to equal the current connection request code; and sending the each connection request along a candidate route. At each node along the candidate route preceding the sink node the first digit is set to '0' when the specified flow rate exceeds the operating vacancy of the succeeding link and the second digit is set to '0' when the specified flow rate exceeds the phantom vacancy of the succeeding link. The search for a candidate route is abandoned if the response code attains a value of '00'. If the response code equals the connection request code, the search for a candidate route is considered successful. Otherwise, another candidate route, if any, may be attempted using a new connection-request code determined as the Exclusive OR function of the current connection request code and the response code.

In accordance with another aspect of the present invention, there is provided a method of network self-provisioning for a network comprising operating nodes, interconnected by operating links and phantom links, and phantom nodes connecting to each other and to the operating nodes by phantom links. The method comprises steps of: associating with each operating link an operating capacity, a phantom capacity, an operating vacancy, and a phantom vacancy; associating with each phantom link a phantom capacity and a phantom vacancy; determining a route set for each of selected pairs of operating nodes; receiving at selected operating nodes a succession of connection requests each connection request indicating a sink node and a specified flow rate; seeking for the each connection request an operating route having a sufficient operating vacancy and a phantom route having a sufficient phantom vacancy; abandoning the phantom route if the operating route is not found; recording utilization of the phantom capacity of each link traversed by each the phantom route; and determining target-link capacity requirements based on the utilization.

In accordance with another aspect of the present invention, there is provided in a network comprising nodes interconnected by links, a controller of a node, the node connecting input links to output links. The controller is operable to: associate an operating capacity and a phantom capacity with each output link; maintain an operating vacancy record and a phantom vacancy record for the each output link; receive a succession of connection requests each connection request indicating a source node, a sink node, a specified flow-rate allocation, and a two-digit connection code; select a candidate output link leading to the sink node; alter the connection code of the each connection request to a modified code according to the operating vacancy, phantom vacancy, and the specified flow rate; and forward the each connection request according to the modified code. The node controller is further operable to: set a first digit of the connection code to '0' if the specified flow rate exceeds the operating vacancy of the candidate output link; set a second digit of the connection code to '0' if the specified flow rate exceeds the phantom vacancy of the candidate output link; forward the connection request to the source node if the connection code is '00'; and forward the connection request along the candidate output link if the code is not '00'. The controller is further operable to retain statistical data of the phantom vacancy record.

In accordance with a further aspect of the present invention, there is provided a provisioning server in a network comprising a plurality of nodes, a plurality of provisioning servers, and links interconnecting the nodes. The provisioning server is communicatively coupled to at least one of the nodes and is operable to: receive occupancy data related to the links from the at least one of the nodes; determine a cumulative statistical distribution of the occupancy data; and determine link-capacity requirement according to the cumulative statistical distribution and a predefined probability threshold. The provisioning server is further operable to: receive a flow-rate-allocation request for each link in a set of links; determine availability of sufficient vacancies in the each link; and communicate an indication of the availability to another provisioning server in the network.

In accordance with another aspect of the present invention, there is provided a method of selecting a route in a self-provisioning network having a plurality of nodes each transmitting signals to other nodes through output links. Each node is designated a route set to each other node and each node receives connection requests each connection request specifying a source node, a sink node, and a flow-rate requirement. The method comprising steps of: associating an operating capacity and a phantom capacity with each output link; associating an operating-vacancy record with the operating capacity and a phantom-vacancy record with the phantom capacity; receiving connection requests and for each connection request examining, for each connection request, the routes of a corresponding route set; selecting the first route in which each link has an operating vacancy exceeding the specified flow rate as an operating route for the each connection request; and selecting the first route in which each link has a phantom vacancy exceeding the specified flow-rate requirement as a phantom route for the each connection request.

BRIEF DESCRIPTION OF THE DRAWINGS

Embodiments of the present invention will be further described with reference to the accompanying exemplary drawings, in which:

FIG. 22 illustrates records, maintained by a provisioning server, of the capacity and vacancy of each link emanating from selected nodes in the network of FIG. 19 in accordance with an embodiment of the present invention.

DETAILED DESCRIPTION

Figure 1:
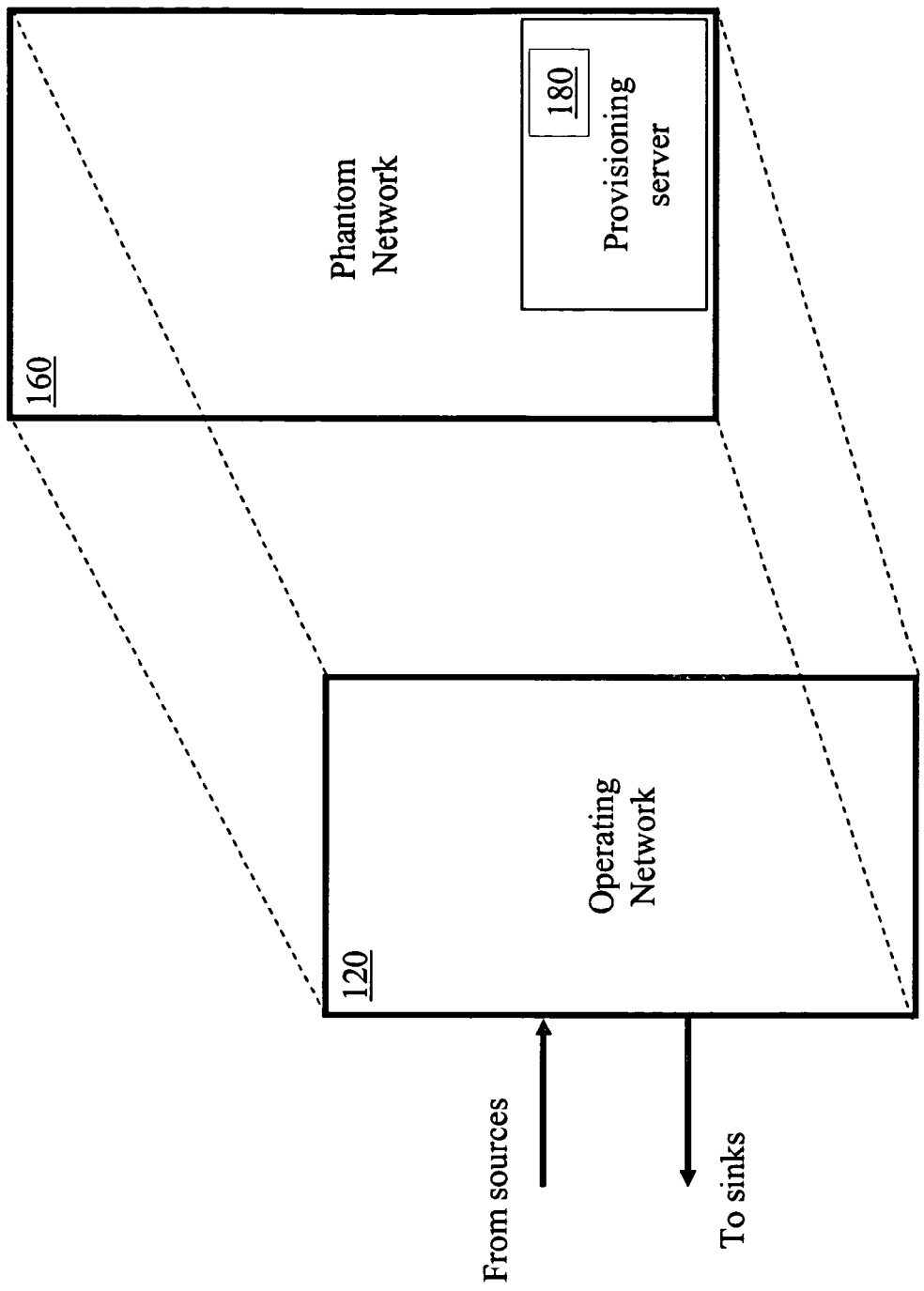
FIG. 1 is an abstraction of the concept of phantom-network provisioning in accordance with an embodiment of the present invention.

The terminology used in describing the embodiments of the invention is listed below.

Edge node: A switching node having subtending information sources and sinks and connecting to other nodes is called an edge node.

Source node: An edge node transmitting signals, received from subtending sources, to other nodes is called a source edge node or a source node.

Sink node: An edge node receiving signals from other nodes, for delivery to subtending sinks, is called a sink edge node or a sink node.

Core node: A switching node connecting only to other switching nodes, which may be edge nodes or core nodes, is called a core node.

Input port: A port of a switching node receiving information signals from either a subtending information source or from an external node is called an input port.

Output port: A port of a switching node transmitting information signals to either a subtending information sink or to an external node is called an output port.

Ingress port: An input port of an edge node receiving information signals from subtending information sources is referenced as an ingress port.

Egress port: An output port of an edge node transmitting information signals to subtending information sinks is referenced as an egress port.

Inbound port: An input port of an edge node receiving information signals from external switching nodes is referenced as an inbound port.

Outbound port: An output port of an edge node transmitting information signals to external switching nodes is referenced as an outbound port.

Inbound channel: An inbound channel is a communication channel, usually a wavelength channel in a fiber-optic link, connecting an inbound port to an external node.

Outbound channel: An outbound channel is a communication channel, usually a wavelength channel in a fiber-optic link, connecting an outbound port to an external node.

Operating node: A switching node in operation is called an operating node.

Operating link: A communications link connecting two operating nodes is herein called an operating link.

Operating route: A route traversing operating links is called an operating route.

Operating route set: A number of operating routes designated to carry traffic from a source node to a sink node is called an operating route set.

Operating network: An existing network having only operating nodes is called an operating network.

Operating connection: A connection through an operating network is called an operating connection.

Operating capacity: The capacity of an operating link is referenced as an operating capacity.

Operating occupancy: The occupancy of an operating link is referenced as the operating occupancy of the link.

Operating link vacancy: The vacancy of an operating link is referenced as the operating vacancy of the link. It is the operating-capacity complement of the operating occupancy.

Operating route vacancy: It is the lowest operating link vacancy of the links along an operating route.

Phantom node: A switching node planned for future inclusion in an operating network is herein called a phantom node.

Phantom link: A communication link connecting a phantom node to an operating node or another phantom node is herein called a phantom link. A phantom link may also be associated with an operating link and allocated a capacity that differs from the operating capacity of the associated operating link.

Phantom route: A route traversing at least one phantom link is herein called a phantom route.

Phantom route set: A number of phantom routes designated to carry traffic from a source node to a sink node is called a phantom route set.

Phantom network: A network comprising operating nodes as well as planned nodes (phantom nodes) that are not yet in operation is herein called a phantom network.

Phantom connection: A connection through a phantom network is called a phantom connection.

Phantom capacity: The attainable capacity of a phantom link is referenced as the phantom capacity of the link. The phantom capacity of a link would normally be higher than the corresponding operating capacity of the same link. However, the phantom capacity is permitted to be lower than the corresponding operating capacity, and may even equal zero to indicate that the link is to be removed.

Phantom occupancy: The occupancy of a phantom link is referenced as the phantom occupancy of the link.

Phantom link vacancy: The vacancy of a phantom link is referenced as the phantom vacancy of the link. It is the phantom-capacity complement of the phantom occupancy.

Phantom route vacancy: It is the lowest phantom link vacancy of the links along a phantom route.

Target capacity: The capacity of a phantom link determined by a provisioning process is called the target capacity of the link. The target capacity cannot exceed the phantom capacity.

Utilization: The term is generally used to refer to the mean value of occupancy. Herein, it is particularly used to denote the mean occupancy of a link determined from several occupancy values.

Topological coincidence: Two networks are said to be topologically coincident if they share the same nodes. However, a link between any two nodes may be assigned different capacities in the two networks.

Flow rate: An allocated capacity, usually in bits per second, of a data stream of any data format is the flow rate of the data stream.

Connection code: A code used to track the state of a connection setup is called a connection code. Herein, a connection code of two digits is used to distinctly track operating and phantom connection setups.

Response code: A connection code returned to a source node in response to a connection setup request is called a response code.

Parent network and embedded networks: A network divided into two or more independent networks is called a parent network. A parent network may be shared by several embedded networks each having its own control system. An embedded network comprises edge nodes, a dynamic share of the core of the parent network, and an exclusive configuration controller.

Routing Methods

Two routing methods are widely used in telecommunications networks. The first is a hop-by-hop routing method where a source node that does not have an available direct link to the sink node forwards a connection request to a neighboring node, which decides how to forward the request. Thus, the source node has a limited control over the path selection. The second routing method is called source routing, where a source node can assign a route toward each sink node. The source-routing method can be significantly enhanced by determining a route set from each source node to each sink node where each route set includes at least one route. Preferably, a route set includes the description of a sufficient number of routes to enable routing traffic streams of widely-varying traffic intensities. The routes in a route set are preferably metric-optimized, i.e., selected to optimize a pre-defined metric, such as propagation delay or the number of traversed nodes. A composite metric defined as a weighted sum of a dimensionless relative propagation delay and the number of traversed nodes may also be used.

Network-Design Automation

Analytical network design methods were developed over the past two decades and were mechanized in computer-based network-design 'tools'. See for example:
 (a) "Analysis and Synthesis of Large-Scale Telecommunications Networks", by Beshai et. al., published in the proceedings of the ITC/CIC International Seminar on Teletraffic and Networks, Beijing China, 1988,
 (b) "The Poissonian Spectrum Method for Treating a Loss System Serving Non-Poissonian Multi-bit-rate Traffic", by Beshai, published in the Proceedings of INFOCOM '89, and
 (c) "Designing an ATM-based Broadband Network: an Overview", by Yan et. al., published in the Proceedings of the IEEE Global Telecommunications Conference, 1995.

The extensive computer-based network planning tools developed so far provide a very useful means for easing the strenuous task of planning a network having numerous nodes. However, these tools rely on traffic-demand data, which can be determined from operational measurements provided at the switching nodes. The data measured at the individual nodes must be processed, 'off line', to provide an estimate of traffic demand, which can be, for example, presented in the form of node-to-node traffic demand. In addition, a description of a current network connectivity, which provides, at least, the capacity of each link in the network, is an essential input to the network-design process. The estimated traffic demands, together with the network-connectivity data and a specified routing discipline, are then applied to a suitable network-design tool to determine the required capacity enhancement. The task of acquiring traffic-demand estimates is a tedious one that hinders the network-provisioning process.

Computational Methods

The computation of a required capacity of each link in the network can be based on simply observing the load and performance of each link individually or by using overall network analysis which takes into account the effect of the routing mechanism deployed and other network controls.

A primitive method based on observing each link in isolation then computing the required link capacity has the advantage of extreme simplicity. Relevant stochastic models that relate traffic load, link capacity, and traffic overflow from the link, are well known for different underlying traffic characterization models. However, provisioning links in isolation can result in an inefficient network.

A method based on network-wide analysis, requires input data that is difficult to acquire, and, the accuracy of the results are largely dependent on the accuracy of an underlying traffic-characterization model. While telephone traffic seems to lend itself to analysis, being generally well-behaved, data traffic has defied every attempt to characterize it. Thus, it would be futile to expend a significant effort to analyze and synthesize a network based on an unreliable traffic-characterization model.

Phantom Network

The traffic pattern in an operating network is likely to deviate from the traffic pattern for which the network has been provisioned. The capacity allocation in the network may require changes to adapt to traffic growth and gradual shift of its spatial distribution. In accordance with the present invention, capacity adaptation is facilitated using a conceptual 'phantom network'.

The planned nodes and the links connecting them to each other and to operating nodes are characterized as phantom nodes and phantom links because the controllers of the current network, including nodal controllers, cannot route connections through them and has to resort to indirect means of determining hypothetical traffic flows in a future network.

A controller of each node may maintain an image of each phantom link connecting the node to other nodes. A phantom link may be derived from an operating link by allocating an upper bound of a phantom capacity that differs from the operating capacity of the operating link. A phantom link may also be a new link connecting two operating nodes. The new link may then be viewed as a link having an operating capacity of zero and a phantom capacity determined as the highest attainable capacity of the link. If the phantom network includes new nodes and new links, a network controller, or a plurality of distributed network controllers may be required to maintain an image of the phantom network. An image of the phantom network would include a specification of an upper bound of the phantom capacity of the network links. In a growing network, the phantom capacity of an operating link would normally be higher than its current capacity. However, it may be desirable to reduce the capacity of a current link in favor of increasing the capacities of other links to better serve the traffic load.

Restating, a phantom network may take one of several forms. In a first form, the phantom network would be topologically coincident with the current operating network where the phantom network has the same nodes and same links of the operating network but offers flexibility in extending the capacities of nodes and links. In a second form, the phantom network may include the same nodes of the operating network but may include further planned links or exclude some existing links. In a third form, the phantom network may intersect the operating network at selected nodes but may include new nodes, herein called phantom nodes, for future incorporation in the operating network. The phantom network would then include phantom links connecting the phantom nodes to each other and to currently operating nodes.

It is worth noting that the capacity of a link, operating or phantom, may be realizable in modular sizes that may be predefined. Modular sizes would be dictated by standardization or other considerations.

FIG. 1 illustrates the basic concept of phantom provisioning. An operating network 120 comprises edge nodes (not illustrated) that support traffic sources and traffic sinks. The network may also include core nodes (not illustrated). The edge nodes may connect directly to each other, or through the core nodes. An edge node receives connection requests from a plurality of traffic sources, each request specifying a traffic sink, and possibly a required flow-rate allocation. Each edge node preferably aggregates connection requests directed to another edge node into node-pair traffic. The network may provide several routes from an edge node to another, and the node-pair traffic may be divided into traffic streams transmitted along different routes. Each controller is naturally aware of the occupancy of each of its outbound links, and the routing function is based on this awareness.

In order to size the network to accommodate traffic growth or shift of spatial traffic patterns, samples of link-occupancy data (also called link utilization data) may be retained and analyzed to determine which links need capacity enhancement, and by how much. In an actual implementation, it may be preferable to use vacancy data rather than occupancy data for computational convenience, the vacancy of a link being the capacity complement of its occupancy, i.e., the sum of the vacancy and occupancy equals the capacity of the link. In the operating network 120, the traffic intensity of some traffic streams may overwhelm their preferred paths, their shortest paths for example, and, hence, be routed through unfavorable paths; an unfavorable path may include more hops, or be unduly long. If the provisioning process is based on the observed occupancy of each link, then it is possible that the capacity of links in unfavorable paths be enhanced, thus encouraging connections to stray away from their preferred paths and rendering network 120 inefficient.

In accordance with the method of the invention, an image of a phantom network 160 is created and each node controller is adapted to route traffic in both the operating network and the phantom network. Thus, a node controller may perform the functions of both operating route selection and a phantom route selection. This function may also be incorporated in a provisioning server 180 as will be described below. As the name implies, the phantom network in its entirety does not exist. However, a phantom network may be intended to become a prospective network, i.e., a future operating network. The phantom network may include all the nodes and links of the operating network, in addition to planned nodes connecting to each other and to the operating nodes by phantom links. A link that is common in both the operating and phantom networks is viewed differently by the two networks. The operating network uses the operating vacancy of the link to determine its availability for an operating connection. The phantom network uses the phantom vacancy of the link to determine its availability for a phantom connection. Because of the different view of capacity, the traffic flow will be different in the operating and phantom networks, with the latter offering a better opportunity to route each connection through its preferred route. In fact, if the attainable capacity is unbounded, then each connection in the phantom network will use its preferred path. In accordance with the present invention, when a node controller receives a connection request it attempts to perform a dual routing process to find an operating route and a phantom route. The operating route is based on the operating capacity and operating vacancy of the operating network. The phantom route is based on the phantom capacity and phantom vacancy of the phantom network. The phantom-occupancy data and not the operating-occupancy data is used in the network provisioning process. In other words, the phantom network guides the growth of the operating network.

Figure 2:
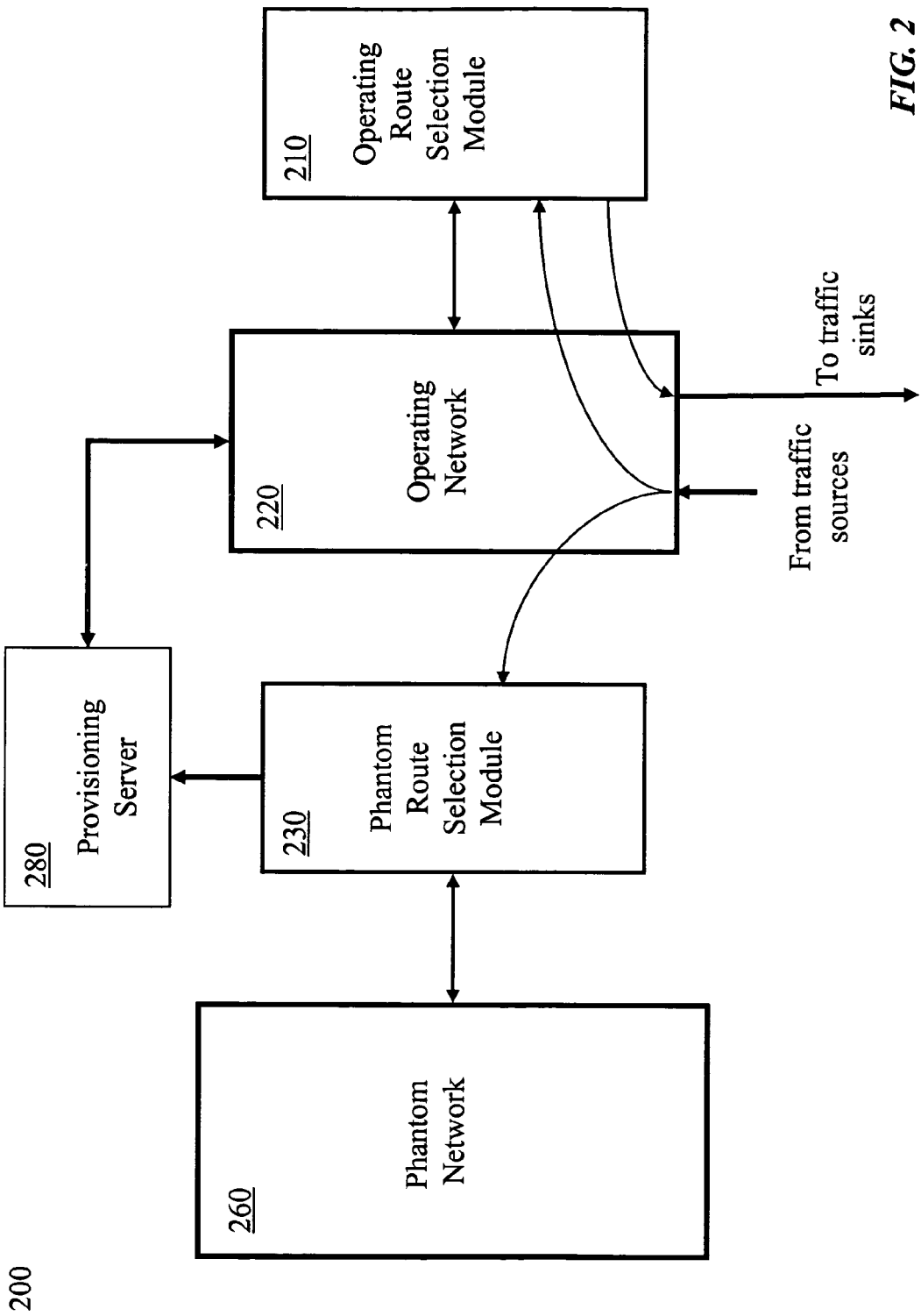
FIG. 2 illustrates a network using a phantom-routing selection module and a provisioning server in accordance with an embodiment of the present invention.

FIG. 2 illustrates an operating network 220 receiving connection requests from subtending traffic sources and delivering data through established connections to traffic sinks. Each connection request is concurrently directed to an operating-route-selection module 210 and a phantom-route-selection module 230. The operating-route-selection module 210 returns to each requesting traffic source a description of a route for the connection or a rejection message if a route to destination cannot be found. Concurrently, the phantom-route-selection module 230 attempts to find a phantom route for each connection request but returns the result to a provisioning server 280 and not necessarily to requesting traffic sources. Alternatively, the source node aggregates phantom-vacancy data and periodically reports the aggregate data to a provisioning server. Both the operating-route-selection module 210 and the phantom-route-selection module 230 may be distributed and incorporated in nodal controllers (not illustrated in FIG. 2) within the operating network 220. Alternatively, either the operating-route-selection module 210 or the phantom selection module 230, or both, may be incorporated in one or more provisioning servers as will be described below. FIG. 2 illustrates one provisioning server 280. Notably, the operating-route-selection module 210 uses connectivity and capacity data of the operating network and the network occupancy state to seek a route for each connection request. The phantom-route-selection module 230 receives the same connection requests and uses the connectivity, capacity, and vacancy (or occupancy) data of the phantom network to seek phantom routes. Only data related to phantom routes are provided to the provisioning server 280.

Figure 3:
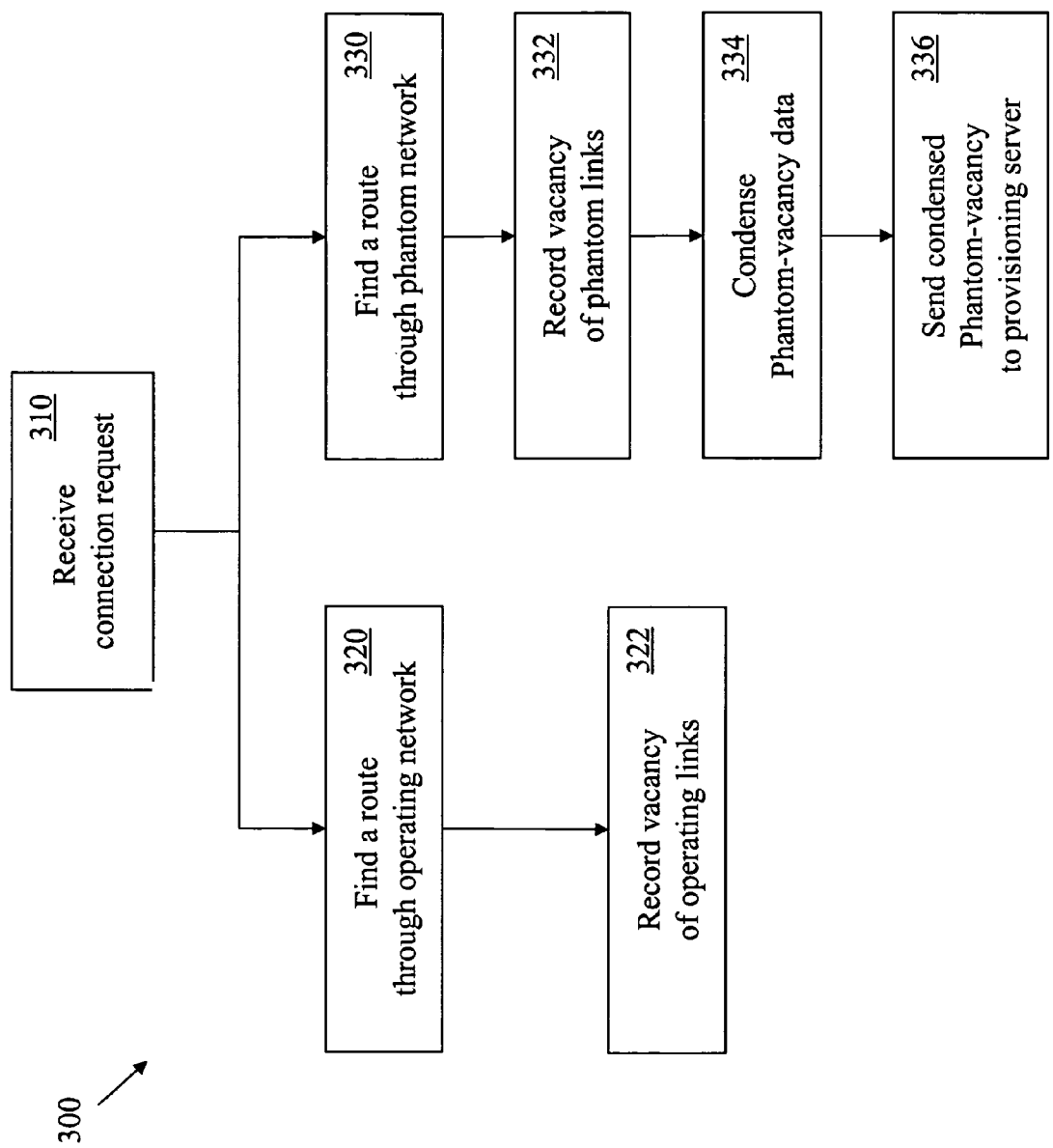
FIG. 3 is a flow chart illustrating the process of finding operating and phantom routes in accordance with an embodiment of the present invention.

FIG. 3 illustrates the basic steps in a dual routing process 300 in the operating and phantom networks of FIG. 2 and the use of phantom-vacancy (or phantom-occupancy) data. When a controller of a node receives a connection request (step 310), it directs the request to steps 320 and 330. In step 320, a process of finding a route through the operating network 220 is initiated. In step 322, the operating occupancy records are updated for use in a subsequent connection routing. In step 330, a process of finding a route through the phantom network 260 is initiated and in step 332 the phantom-occupancy records are updated for use in a subsequent connection routing. If the phantom network and operating network are topologically coincident, the processes of route finding in the two networks can be combined to use a unified messaging process.

In step 334, the phantom-vacancy data is condensed to contain only data relevant to network provisioning. The relevant data would include a subset of observed vacancy data. The condensed data from each node is sent to a provisioning server (step 336), which may be centralized or distributed. If step 320 fails to find an operating route while a phantom route is found, the phantom route is discarded and the corresponding phantom vacancy records are restored. The phantom vacancy records of links traversed by a discarded phantom connection setup are not reported to the provisioning server 280.

Rather than sending real-time measurement data (vacancy records) to the provisioning server, a node may aggregate the measurement data, on a daily basis for example, and report only the aggregated data to a respective provisioning server or some other network-processing facility.

Steps 320 and 322 are functions of the operating route-selection module 210 while steps 330 to 336 are functions of the phantom route-selection module 230. These functions may be implemented by node controllers (not illustrated) or by a provisional server 280 which may be centralized or distributed to take the form of a plurality of provisioning servers geographically distributed across the operating network.

Restated, the method of the invention relies on link vacancy observation, just like the primitive method discussed earlier. However, it implicitly takes into account the effect of the routing mechanism on distributing the node-to-node traffic load among a plurality of routes. When an operating connection is routed over an unfavorable path, its companion phantom connection is setup along a favorable path. Thus, the provisioning process does not necessarily increase the capacity of an overloaded link. Rather, the cause of overload is eliminated. Links are selected for capacity enhancement in a manner that attempts to accommodate the traffic from a first node to a second node within the most favorable routes selected from among the routes connecting the first node to the second node.

Network-Sizing

The operating network has edge nodes that support traffic sources and sinks and may have core nodes that connect only to edge nodes and other core nodes. Each edge node (source edge node) may have traffic streams directed to several other edge nodes (sink edge nodes). The source node keeps a record of a current flow rate of each of its traffic streams. A connection belonging to a data stream may request an increment or decrement of its allocated flow rate. The flow-rate-record of a data stream is updated with each admission or termination of a connection or with changes in its flow-rate allocation. A connection request, initiated by a traffic source, specifies a node pair and a required flow-rate allocation. The flow-rate allocation is in essence a capacity allocation.

A route set may be defined for each source node to sink node pair. The routes in a route set are preferably pre-calculated and updated only when new nodes or new links are installed. A route description would typically require a record of a few bytes and even in a high-capacity wide-coverage network the required storage of route-set information is moderate. For example, in a network having 10,000 edge nodes, each edge node would have to store 9,999 route sets requiring a few megabytes of memory.

A node, whether an edge node or a core node, comprises input ports, output ports, a switching fabric, port controllers (processors) and at least one node controller (processor). Reference to a process carried out by a node implies that the process is carried out by a controller (a processor) of the node.

A method of network self provisioning, in accordance with the present invention, views a network as an operating network 220 and an associated phantom network 260. The operating network 220 has a first set of nodes (not illustrated in FIG. 2) interconnected by a first set of links where selected nodes of the first set of nodes are edge nodes that support traffic sources and sinks. The phantom network comprises a second set of nodes (not illustrated in FIG. 2) interconnected by a second set of links. An operating route set and a phantom route set from each of the selected nodes (the edge nodes) to each other of the selected nodes are determined.

Connection requests are received at the selected nodes. Each of the connection requests specifies a source node, a sink node, and a flow-rate-allocation requirement, both the source node and the sink node belonging to the edge nodes. For each connection request an operating-connection-setup process for an operating connection through the operating network 220 is executed. If an operating connection setup is successful, a phantom-connection setup process for a phantom connection through the phantom network is executed. Occupancy records (or vacancy records) of each link in the second set of links traversed by the phantom connection are recorded to be used for determining a target capacity for each link in the phantom network based on the occupancy records (or the vacancy records). The second set of nodes includes a subset of the first set of nodes and phantom nodes scheduled for future inclusion in the operating network. The subset of the first set of nodes includes the edge nodes of the operating network. The target capacity is ascertained by determining a respective statistical complementary function of the occupancy records for the each link and selecting the target capacity to correspond to the occupancy value exceeded with a prescribed probability as will be described below with reference to FIG. 23.

Figure 4:
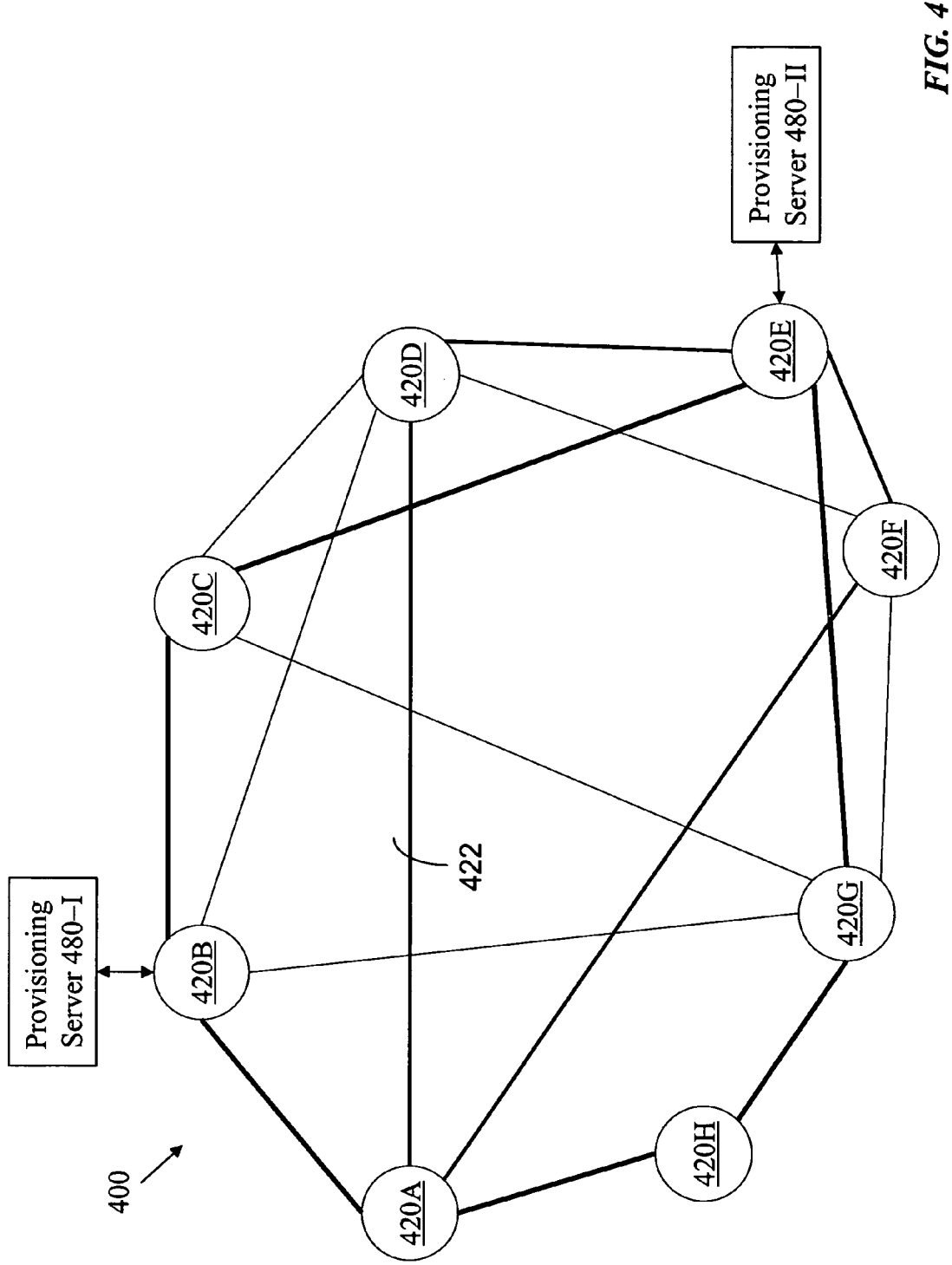
FIG. 4 illustrates an operating network provided with provisioning servers for use with an embodiment of the present invention.
Figure 5:
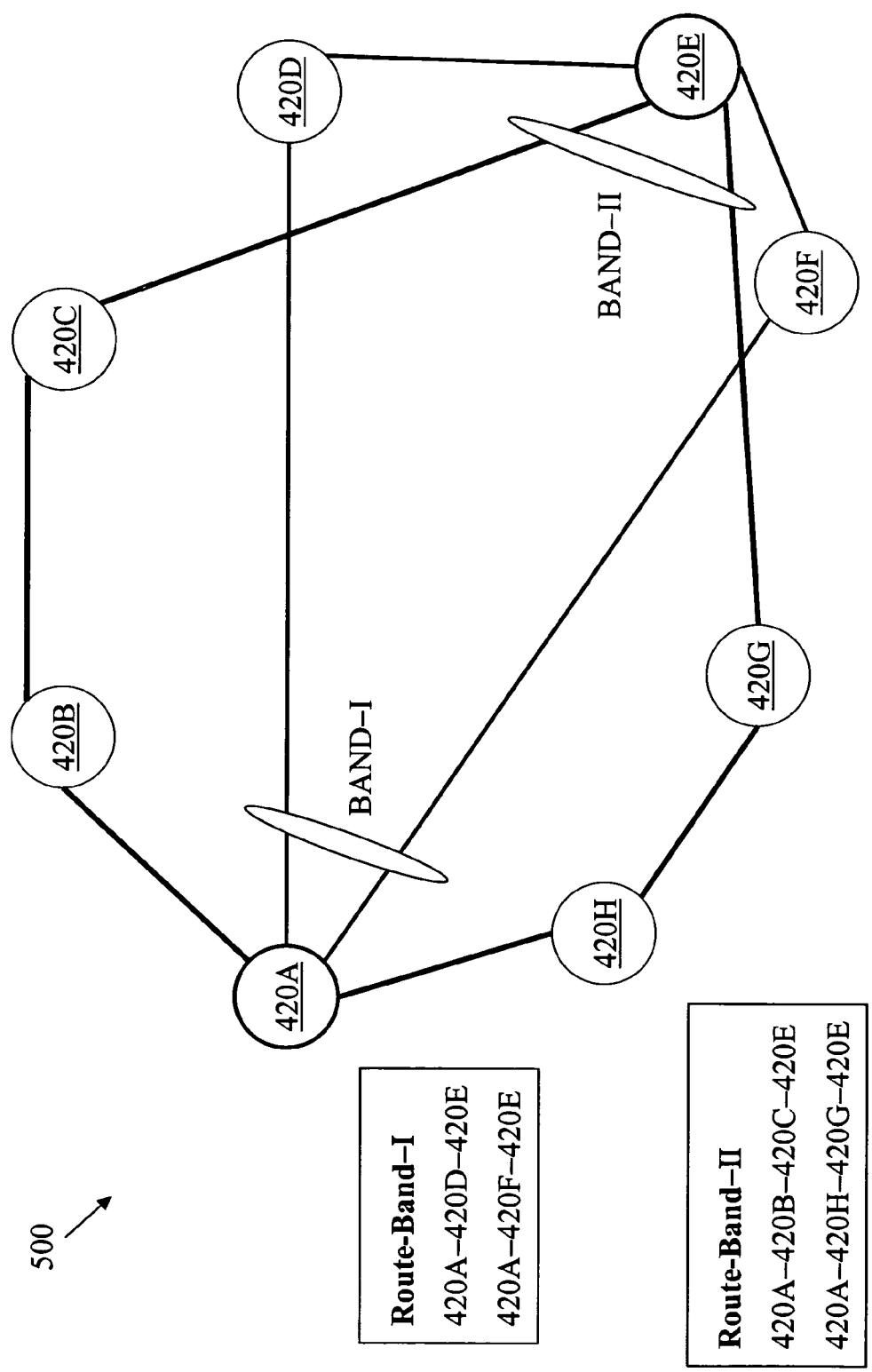
FIG. 5 illustrates a route set in the operating network of FIG. 4 for a directed node pair where the routes in the route set are divided into route bands for use with an embodiment of the present invention.

FIG. 4 illustrates a network 400 having eight nodes 420A, 420B, 420C, 420D, 420E, 420F, 420G, and 420H, also labeled nodes A to H. The nodes are interconnected by links 422. Node 420A has a route-set 500, illustrated in FIG. 5, to node 420E comprising routes A-D-E through node 420D, A-F-E through node 420F, A-B-C-E through nodes 420B and 420C, and a route A-H-G-E through nodes 420H and 420G. The routes are divided into route bands, the first band, route-band-I, including routes A-D-E and A-F-E with the second band, route-band-II, including routes A-B-C-E and A-H-G-E. The division of a route set into route bands may be based on several metrics, such as the propagation delay along each route, and the number of intermediate nodes traversed by each route. In this example; each route in the first band traverses a single node while each route in the second band traverses two nodes.

Figure 6:
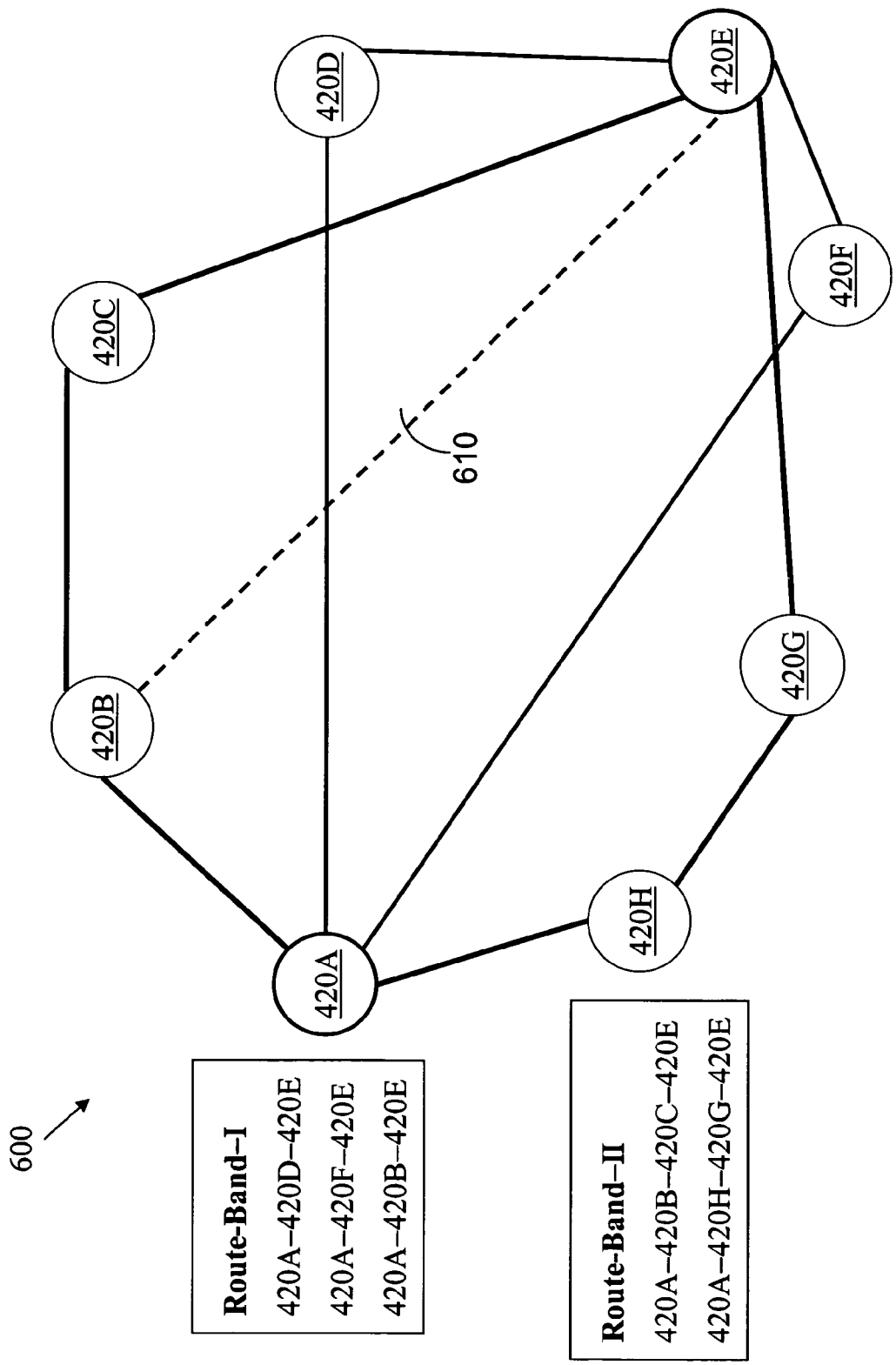
FIG. 6 illustrates a modified route set for the same node pair of FIG. 4 where an additional phantom link is considered.

The Phantom network 160 (or 260) may include links not present in the operating network 120 (or 220). FIG. 6 illustrates an example where a link 610 connecting node 420B to node 420E is planned for future introduction in network 400. A phantom network associated with operating network 400 may then permit route sets for some node pairs to differ from corresponding route sets of the operating network 400. In the example of FIG. 6, a phantom route A-B-E connecting node 420A to node 420E through node 420B is introduced and may be included in route-band-I because it traverses only one intermediate node. The route-set 600 of FIG. 6 applies only to the phantom network associated with operating network 400. However, the route set may also be used for the operating network by setting the operating capacity of route A-B-E equal to zero.

As discussed above, using a primitive link sizing method that determines the required link sizes based on statistics of individual-link occupancy can lead to an inefficient network. With temporal variation of the spatial traffic distribution and operating link capacities that do not match the spatial traffic distribution, it is possible that numerous node pairs, each having a preferred route, or a band of preferred routes, occupy each other's preferred routes and direct their traffic through unfavorable routes. The link-occupancy statistics would then lead to enhancing the capacities of unfavorable routes. This problem can be partially remedied using prior-art techniques such as continually rearranging connections in progress. However, rearranging connections in progress may be operationally problematic.

Figure 7:
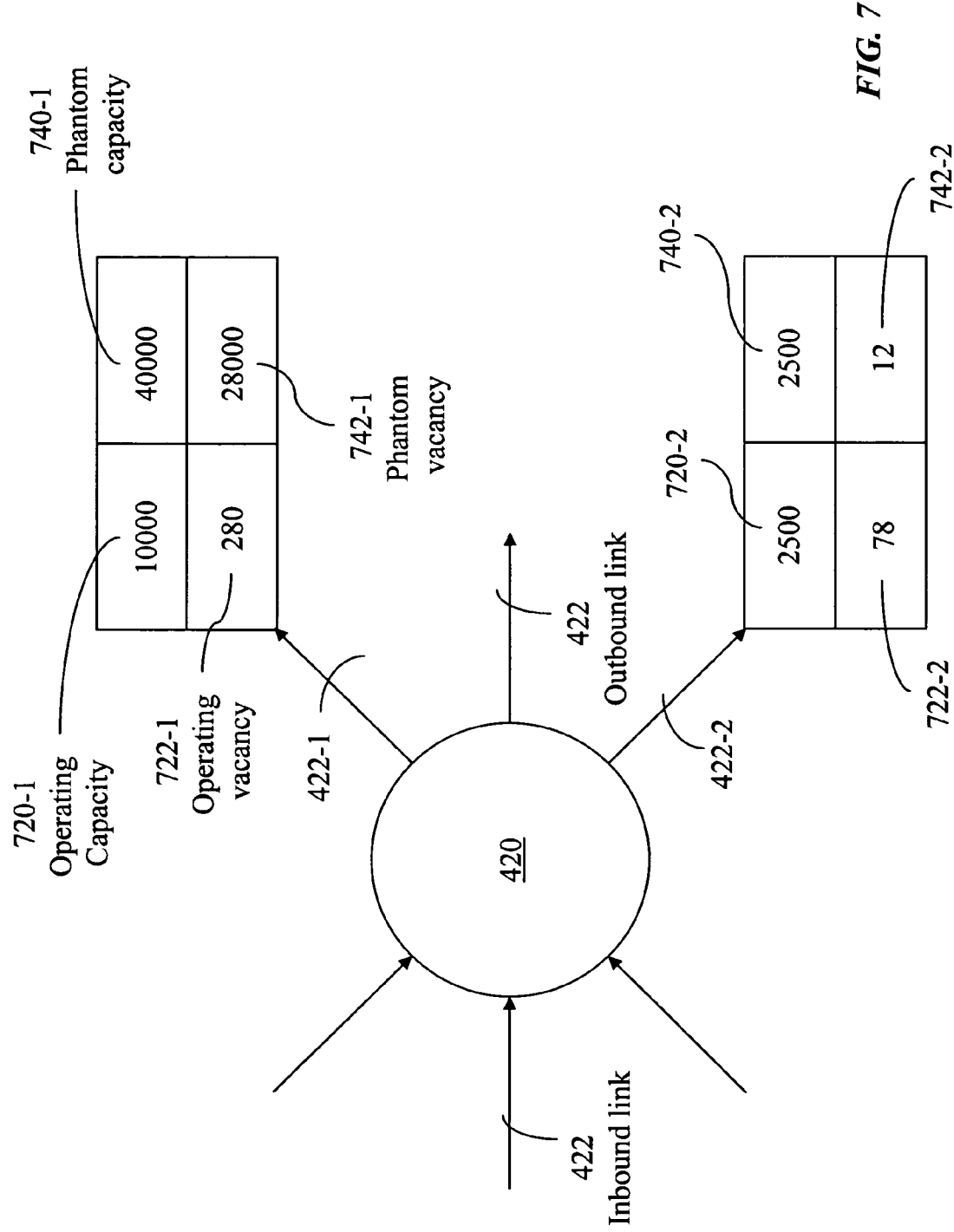
FIG. 7 illustrates a node adapted to maintain operating and phantom capacity data and operating and phantom vacancy data in accordance with an embodiment of the present invention.

FIG. 7 illustrates the capacity parameters and vacancy records of outbound links of a node. A controller of the node maintains two capacity parameters for each outbound link. The first parameter, 720, is the operating capacity and the second parameter, 740, is the phantom capacity, which is the maximum capacity that can be provisioned. The phantom capacity may be constrained by node-capacity limitations, other facility limitations, reliability requirements, etc. The controller also maintains two vacancy records for each outbound link. The first record contains an operating vacancy 722 of the link, and the second record contains a phantom vacancy 742 of the link. The capacity parameters 720-1 and 740-1 for an outbound link 422-1 are 10,000 units and 40,000 units respectively. The vacancy records 722-1 and 742-1 for the outbound link 422-1 are 280 units and 28,000 units respectively. A suitable flow-rate unit or capacity unit would be 1 megabit per second. The phantom vacancy 742-1 for link 422-1 is significantly high. The corresponding capacity parameters for another outbound link 422-2 are 2,500 and 2,500 units indicating that the link capacity can not be enhanced. The operating vacancy record 722-2 and the phantom vacancy record 742-2 for outbound link 422-2 are 78 and 12 respectively.

Figure 8:
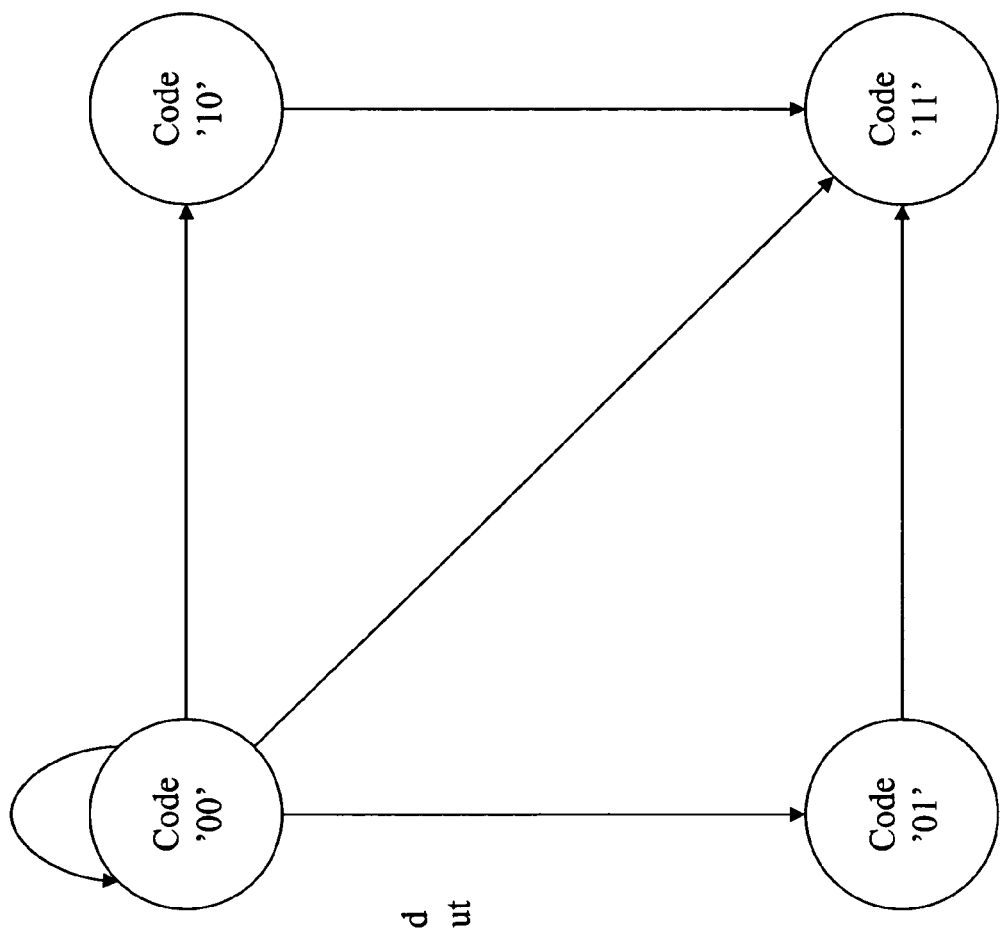
FIG. 8 illustrates a connection code to be used for route selection in accordance with an embodiment of the present invention.

FIG. 8 illustrates a connection code to be used for tracking the state of a connection setup. The connection code has two binary digits, the left bit is set to '0' when a route has not yet been found in the operating network, and '1' otherwise. The right bit is set to '0' if a route has not yet been found in the phantom network and '1' otherwise. When a connection request is received, its connection code is implicitly '00'. It is noted however that in the connection setup process described below with reference to FIG. 9 and FIG. 10, the process starts by assigning a connection code of '11' in anticipation of a successful operating connection setup and a successful phantom connection setup along a first candidate route. The connection code may be modified as the connection setup process progresses along the first candidate route and possibly along other candidate routes.

(For the sake of clarity, the term 'code' in FIGS. 8 to 11 is used to indicate a connection code.)

The search for a dual connection, from a source node to a sink node, which includes an operating connection and a phantom connection, may be carried out over two or more candidate routes in a route set. A connection request along a current candidate route selected from among the routes of the route set is appended with a current connection code specific to the candidate route. The current connection code may be modified at any node along the current candidate route to become a response code and either the sink node or another intermediate node along the candidate route returns the modified connection code, i.e., the response code, to the source node. Upon receiving the response code, the source node may terminate the search process. If further search is required, the source node may select a new candidate route and generate a new connection code to be used as the current connection code for the new candidate route.

A connection code '10' would arise if a connection can be routed through the operating network but not in the phantom network. This unexpected state can be reached when phantom vacancy on a given route becomes lower than the operating vacancy, for example after connections have been rejected by the operating route but accepted in the phantom route. This may occur even if the phantom capacity significantly exceeds its associated operating capacity.

If the operating network and phantom network are topologically coincident, a node pair comprising a source node and a sink node may have the same route set. If the operating network and phantom network have common nodes but at least one link is not common in the two networks, the route set in the operating network and the phantom network, for the same node pair, may differ.

Routing Procedure

Figure 9:
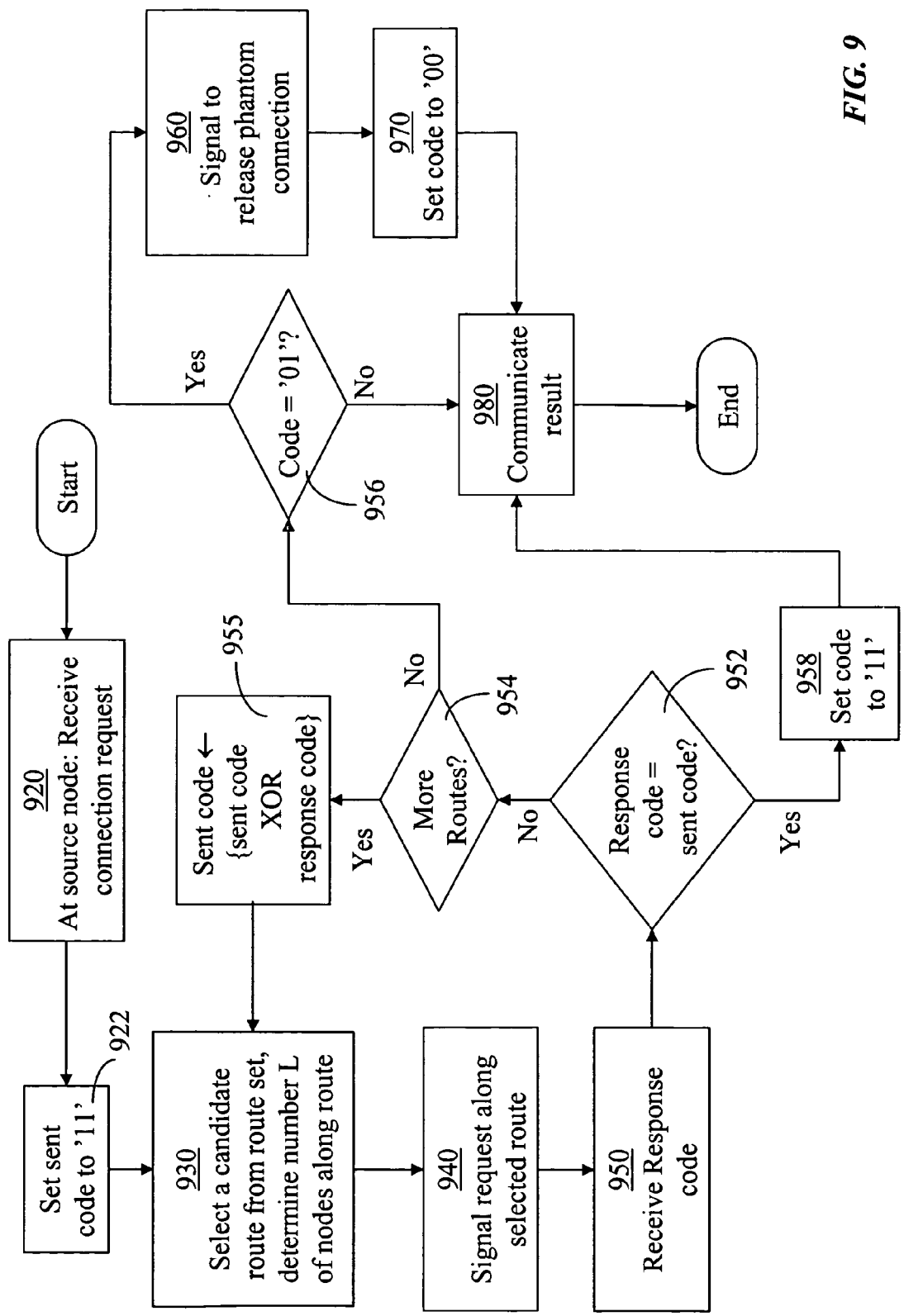
FIG. 9 is a flow chart illustrating a process implemented at a source node to allocate an operating and a phantom route in accordance with an embodiment of the present invention.

FIG. 9 illustrates the main steps implemented in a connection setup by a source node to route a connection to a sink node in accordance with the present invention. The method of finding the operating and phantom routes starts with the anticipation that both the operating and phantom routes will be found. A connection code, as described with reference to FIG. 8, is used to track the state of a connection. The connection code has two digits; the left digit relates to an operating connection, i.e., a connection through the operating network, and the right digit refers to a phantom connection through links each having a phantom capacity that may differ from its current operating value. A phantom connection may also traverse phantom links that are planned but not yet provided, i.e., having a current operating capacity of zero. The phantom network may also include links that are currently operating but are planned to be removed from the network. Thus, a link may have a positive operating capacity and a zero phantom capacity.

In step 920, a connection request is received and a connection code of '11' is set in step 922. In step 930, a candidate route is selected from a route set and the number L of remaining nodes along the selected route is initialized to equal the total number of nodes in the route. The connection request, having a connection code as initialized in step 922 or as received from step 955, to be described below, is then sent along the selected route (step 940). In step 950, the source node receives a response code from either the sink node or from an intermediate node along the path to the sink node. The returned connection code is a one of '00', '01', '10' and '11'. In step 952, if the response code is found to equal the sent code, the connection request is considered successful with both the operating route and the phantom route allocated. The connection code is then set to equal '11' in step 958 and, in step 980, results are sent to the traffic source that initiated the request. Otherwise, if step 952 determines that the response code differs from the sent code, the source node considers the processing of the connection request incomplete and step 954 is executed. This condition is reached when either the operating route or the phantom route is not allocated. If it is determined in step 954 that at least one route in the route set from the source node to the sink node has not yet been attempted, the connection code is updated in step 955 for a new route to be selected in step 930. The updated connection code (also referenced as a retry code) is determined as a bit-wise Exclusive OR (XOR) of the sent code and the response code. In the bit-wise XOR operation the left digit of the outcome is the XOR of the two left digits of the operands and the right digit of the outcome is the XOR of the two right digits of the operands. In step 930, the source-node controller selects a new route from the route set and sends a connection request having the updated connection code along the new route. If, on the other hand, step 954 had determined that all routes have been attempted, the process continues to step 956. This point is reached when the response code (returned code from the sink node or any other node along the last attempted route) is one of '00', '01', or '10'. If the response code is '01', i.e., a phantom route has been found but an operating route was not found, the phantom route must be deleted and, if capacity has been reserved, the phantom vacancy of respective links may be updated. In general, a phantom connection is terminated when the accompanying operating connection is terminated. Otherwise the phantom resources allocated to the connection would never be released.

Thus, in step 960, where the present state of the connection code is '01', the controller of the source node signals along the route selected for the phantom connection to release the allocated resources. The response code is then set to '00' in step 970, the requesting source node is informed, and the connection-request process is complete. With a response code of '00', the source-node controller may record a blocking incidence against both the actual and phantom connection attempts. With a response code of '10', the operating connection proceeds but the source-node controller may record a blocking incidence against the phantom connection attempts. When an operating connection is released, the corresponding allocated operating capacity and, when applicable, the phantom capacity are released.

The routes in a route set may be sorted into individual routes or in route bands, the sorting being based on a merit criterion and routes within a band are deemed to be of comparable merit. A merit may be determined according to propagation delay and other route properties. In step 930, the selection of a candidate route from a sorted list of individual routes is straightforward. If the route set is divided into bands, a cyclic pointer is associated with each route band. The pointer of a band is increased by 1 for each selection of a route within the band with the pointer returning to a reference value when the pointer exceeds the number of routes in the band. A route is selected according to the value of the pointer.

Figure 10:
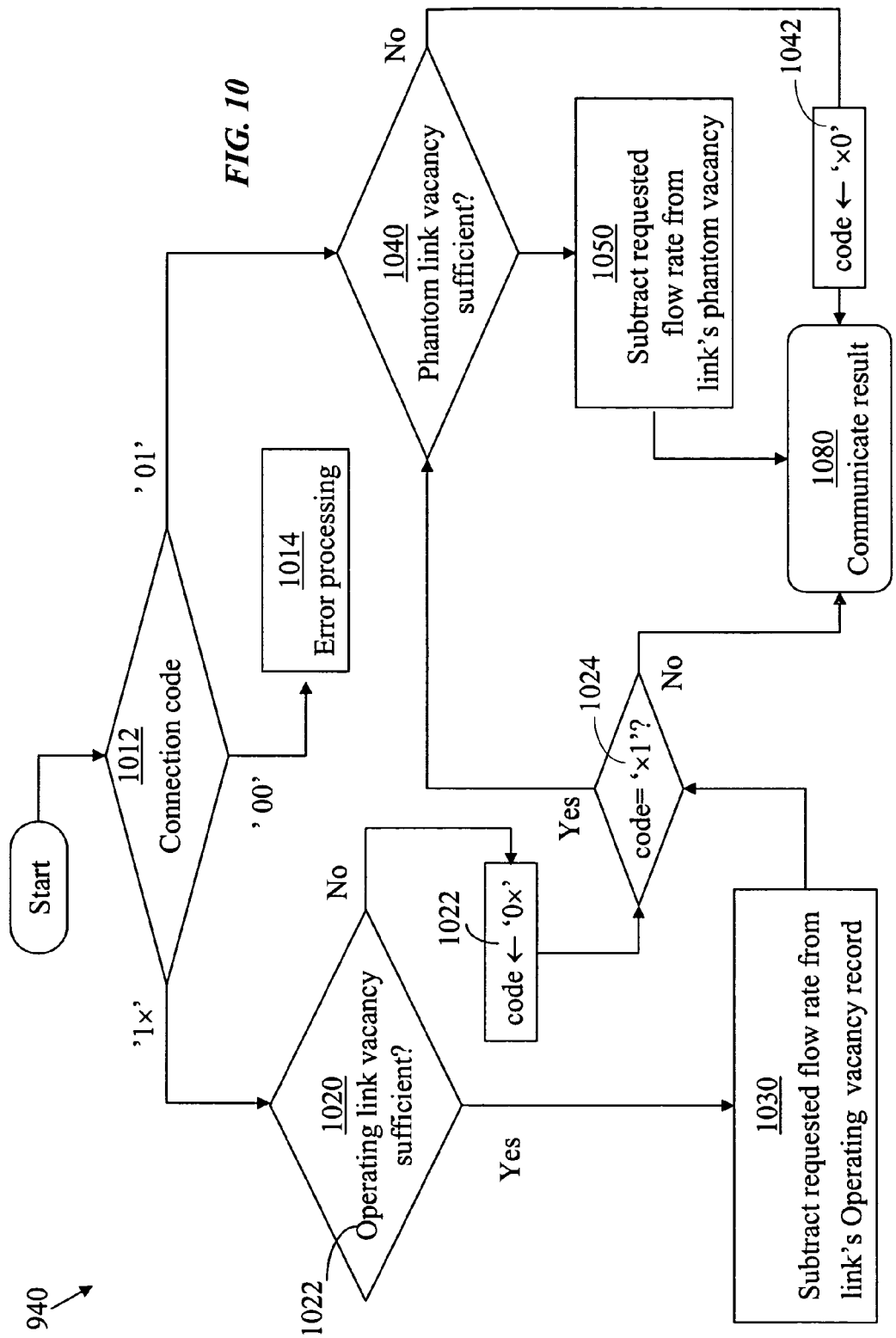
FIG. 10 is a flow chart illustrating a process implemented at an intermediate node along a candidate route for allocating an operating and a phantom route in accordance with an embodiment of the present invention.

FIG. 10 is a flow chart detailing step 940 implemented at each node, including the source node, to allocate capacity in response to a connection request. The process of FIG. 10 applies to the case where the operating network and the phantom network are topologically coincident. A connection-request message is transmitted along a candidate route. The source node indicates the number of nodes to be traversed, and the identity of each node. The number of remaining nodes along the selected route is denoted 'L', and initially assigned the total number of nodes, including the source node and the sink node, along the selected candidate route. This number 'L' is appended to a connection-request message.

The connection code at any node along a candidate route can be one of '00', '01', '10', or '11'. A connection code of '00' indicates that the both the actual and phantom connection-setup attempts have failed along a preceding part of the route and, hence, the route-finding process should have abandoned the search along the operating route and sent the return code to the source node. Thus, in step 1012, if a node receives a connection request indicating a connection code of '00'; an error message is signaled back to the source node for error processing (step 1014).

In step 1012, if the connection code is '1x' where x denotes a 'don't-care' state (i.e., the connection code is '10' or '11'), then a link leading to the succeeding node in the candidate route is examined to determine its operating vacancy. Step 1020 directs the process to step 1022 if the available operating vacancy is insufficient to accommodate the connection request. Otherwise, step 1020 directs the process to step 1030. In step 1022, the connection code is set equal to '0x', indicating that the request was rejected along the operating route and the process is directed to step 1024. In step 1030, the requested flow-rate allocation is subtracted from the operating link vacancy and the process is directed to step 1024. In step 1024, which can be reached either from step 1022 or from step 1030, if the connection code is 'x1', indicating that a phantom route is yet to be found, then, in step 1040, the phantom vacancy of the link to the succeeding node is examined. If, in step 1024 the connection code is found to be 'x0', indicating that a phantom route has been found in a previous candidate route, then the process is directed to step 1080.

If, in step 1040, it is determined that the available phantom vacancy is insufficient to accommodate the flow rate specified by the connection request, the connection code is changed to 'x0' in step 1042 and the process is directed to step 1080. Otherwise, the requested flow rate is subtracted from the link's phantom vacancy in step 1050 and the process is directed to step 1080.

In step 1080 the connection code and possibly the parameter L of the remaining number of nodes along the candidate route are communicated to either a subsequent node or to the source node.

Figure 11:
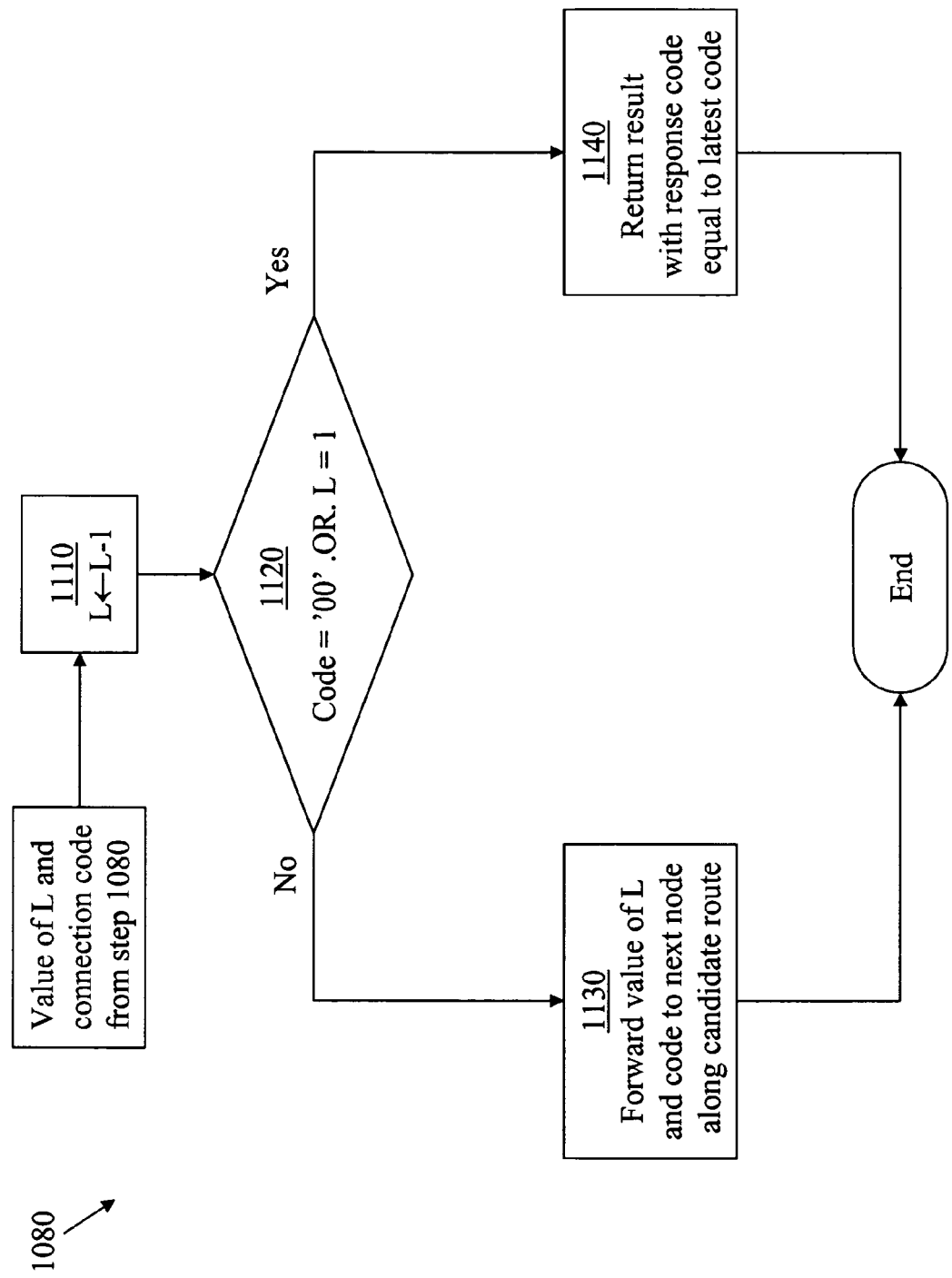
FIG. 11 illustrates a step in the process of FIG. 10.

FIG. 11 describes further details of step 1080 of FIG. 10. At each node along a candidate route, the number L of remaining nodes along the candidate route is examined and if found to be greater than one, a subsequent node along the route is considered, and L is reduced by 1 (step 1110). The number of remaining nodes is used as an indicator to terminate a connection-setup process, but other indicators may be devised for this purpose. In step 1120, the last connection code is examined and if found to equal '00', indicating that a connection request was denied along the last candidate route, then step 1140 is implemented. If the code is not equal to '00' but the remaining number of nodes is 1 (L=1), indicating that the subsequent node along the last candidate route is the sink node, then the process is also directed to step 1140. Step 1140 sends the value of L and the connection code, which is now a response code, to the source node that initiated the connection request.

If, in step 1120 neither L=1 nor the connection code is '00', then step 1030 is implemented. In step 1030, the connection request proceeds to the subsequent node along the candidate route under consideration. The connection request includes the value of L, the last value of the connection code, and the required flow-rate allocation.

In the process described with reference to FIG. 10 and FIG. 11, the sink node does not participate in the connection-setup process. The underlying assumption is that a prior service-level agreement would have determined the sink node's acceptance to receive data at the specified flow-rate and direct it to the intended traffic sink. However, if it is desired that the sink node's acceptance of the traffic load be ascertained upon completion of the operating connection along the entire route from the source node to the sink node, then the process described above with reference to FIG. 10 and FIG. 11 may be modified so that if the received connection code is determined in step 1012 to be different from '00', then before proceeding to step 1020 or step 1040 the value of L is examined. If the value of L is found to equal zero, a process of communicating with the sink node to gain its acceptance of the traffic load is initiated. If the traffic sink rejects the connection request, no attempt would be made for a phantom connection setup and if one has already been setup the corresponding phantom resources would be released.

Thus, the completion of an operating connection setup attempt along a candidate route traversing a number of nodes may be determined either by the sink node, where L=0, or by the node immediately preceding the sink node, where L=1. In either case, the node terminating the connection setup attempt (successfully or otherwise) signals a response code back to the source node that initiated the connection request. The response code includes the last state of the connection code and may also include other information. It is noted, however, that if the route includes only one link, then the node immediately preceding the sink node is the source node which can directly determine the availability or otherwise of an operating or phantom route.

It is worth noting that the use of the remaining number L of links to destination to end the search is one of many other indicators. For example, each node may examine the route description to determine whether or not it is the sink node.

Figure 12:
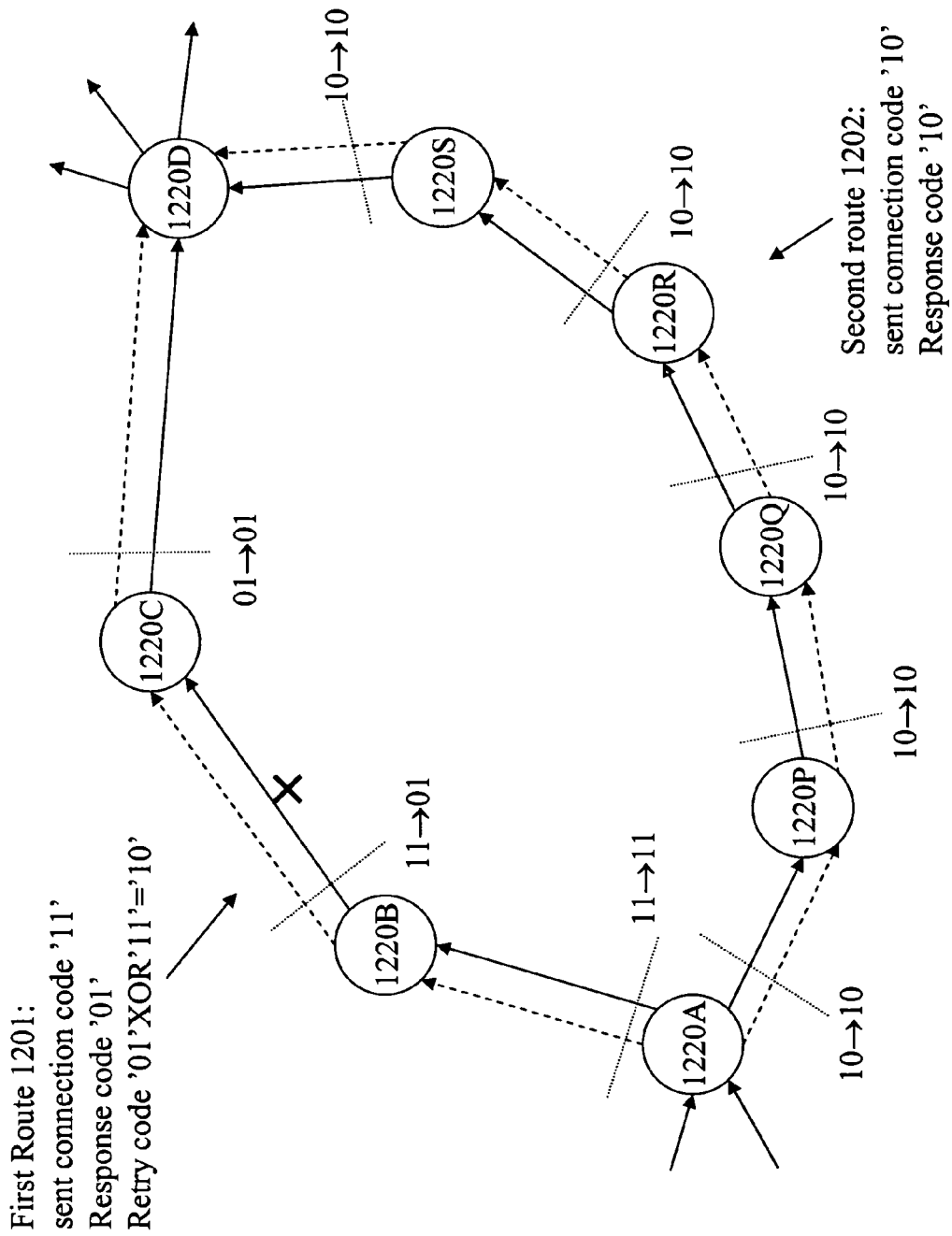
FIGS. 12, 13, 14, and 15 provide examples of connection setup based on the processes of FIGS. 9 to 11.

FIG. 12 illustrates an example of the route-selection procedure described above with reference to FIG. 9, FIG. 10, and FIG. 11 for a connection request. The connection request specifies a directed pair of edge nodes 1220A and 1220D, node 1220A being the source node and node 1220D being the sink node. The connection request also specifies a flow-rate-allocation (capacity allocation for the connection). The flow-rate-allocation is used in both the operating connection setup and the phantom connection setup. Two routes of a route set of directed node-pair 1220A to 1220D are illustrated. The first route 1201 traverses intermediate nodes 1220B and 1220C and the second route 1202 traverses intermediate nodes 1220P, 1220Q, 1220R, and 1220S. A controller of 1220A initializes a connection code as '11'. Thus both the operating and phantom connection attempts are initialized as successful until either is proven otherwise. In FIG. 12, the operating routes and the phantom routes are coincident but each link along a route may have a phantom capacity that differs from its operating capacity. The operating routes are represented by solid lines while the phantom routes are represented by dashed line for ease of distinction. The same discipline is used in related FIGS. 13 to 15.

In the example of FIG. 12, node 1220A selects the first route and determines that each of the operating vacancy and phantom vacancy of the link from node 1220A to 1220B is sufficient to accommodate the specified flow rate. Node 1220A therefore forwards the connection request, without modifying the connection code ('11'), to node 1220B. Node 1220B determines that the operating vacancy is less than the specified flow rate and, therefore, changes the connection code from '11' to '01', indicating that an operating connection cannot be established along the first route 1201 but a phantom connection is so far successful. Node 1220B forwards the connection request with the new code '01' to node 1220C in order to complete the phantom connection. Node 1220C examines only the phantom vacancy of the link from node 1220C to 1220D and determines that the phantom vacancy is sufficient to accommodate the specified flow rate.

In one embodiment, node 1220C may forward the connection request, without modifying the connection code, to node 1220D, i.e., node 1220D receives a connection code of '01'. Sink node 1220D may then forward an identifier of the connection request and the last value of the connection code to the source node 1220A along any path from node 1220D to 1220A.

In another embodiment, node 1220C may also forward an identifier of the connection request and the last value of the connection code directly to the source node 1220A along any path from node 1220C to 1220A.

Upon receipt of the connection code, '01' in this case, source node 1220A performs a bit-wise Exclusive-OR (XOR) logical operation on the response code '01' and the connection code, '11', that it has sent along the first route. The resulting connection code (indicated in FIG. 12 as the 'retry' code). is then '10'. Source node 1220A then selects the second route 1202 in an attempt to route the operating connection which has failed along the first route 1201. Node 1220A examines the operating vacancy along the link to node 1220P and determines that the operating vacancy is sufficient to accommodate the specified flow rate. Node 1220A, therefore, forwards the connection request without modifying the connection code to subsequent node 1220Q, i.e., node 1220Q receives a connection code of '10'. The process continues successfully to node 1220S which returns an identifier of the connection request with the last value of the connection code, '10' in this case, to the source node 1220A. The source node 1220A determines that the returned code (which is the response code defined earlier) '10' equals the connection code it has sent along the second route and terminates the search process.

Figure 13:
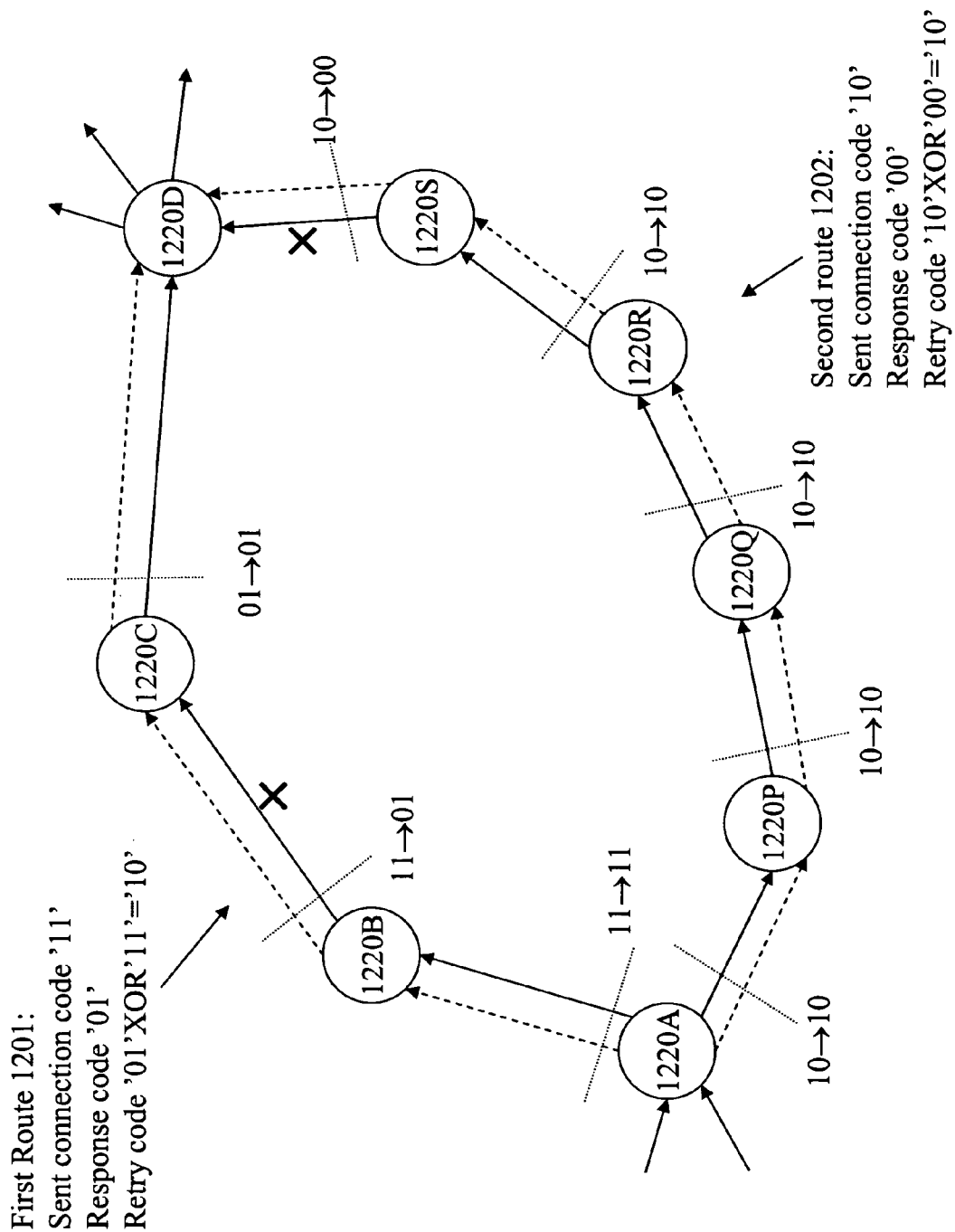

FIG. 13 illustrates another example of the route-selection procedure. The connection code is initialized to '11' at the source node 1220A as in the example of FIG. 12. The operating connection fails along the first route 1201 but the phantom connection succeeds. The operating connection request is then directed by the source node 1220A to the second route 1202 as in the example of FIG. 12 and succeeds along the path from node 1220A to 1220S. Node 1220S, however, determines that the operating vacancy along the link from 1220S to 1220D is insufficient to accommodate the required flow rate. Node 1220S, therefore, modifies the connection code '10' it receives from node 1220R to '00' and returns the new code '00' to the source node 1220A as the response code. Source node 1220A then determines the bit-wise EXCLUSIVE OR (XOR) of the response code '00' it received and the connection code '10' it has sent along the second route 1202. The outcome of the XOR operation, '10' (the retry code), is then sent by the source node 1220A along a third route (not illustrated) in the route set of directed node pair 1220A, 1220D.

Figure 14:
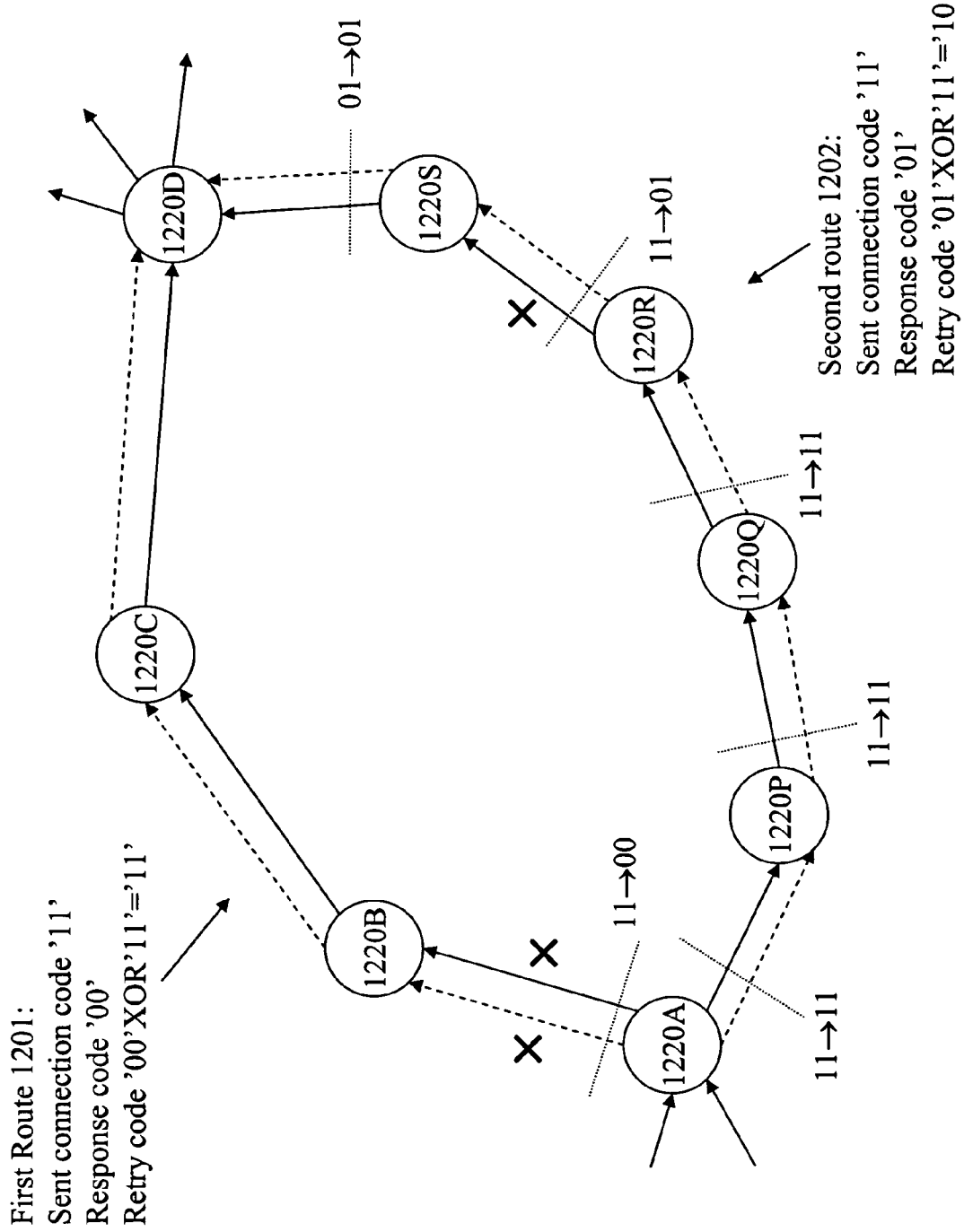

FIG. 14 illustrates another example of route-selection procedure. The connection code is initialized to '11' at the source node 1220A as in the previous two examples. Both the operating connection and phantom connection fail along the first link of the first route 1201 and the connection code is then changes to '00'. The connection setup process does not progress any further along the first route 1201. Node 1220A then performs a bit-wise XOR operation of the connection code '11' it has just initialized and the response code '00' to yield a connection code '11' (a retry code) to be associated with a connection request to be sent along the second route 1202. The connection request succeeds along the path from node 1220A to 1220R. Node 1220R, however, determines that the operating vacancy along the link from 1220R to 1220S is insufficient to accommodate the required flow rate. Node 1220R, therefore, modifies the connection code '11' it receives from node 1220Q to '01' and returns a response code '01' to the source node 1220A. Source node 1220A then determines the bit-wise EXCLUSIVE OR (XOR) of the response code '01' it receives and the connection code '11' it has sent along the second route 1202. The outcome of the XOR operation, '10', is then sent along a third route (not illustrated) in the route set of directed node pair 1220A, 1220D.

Figure 15:
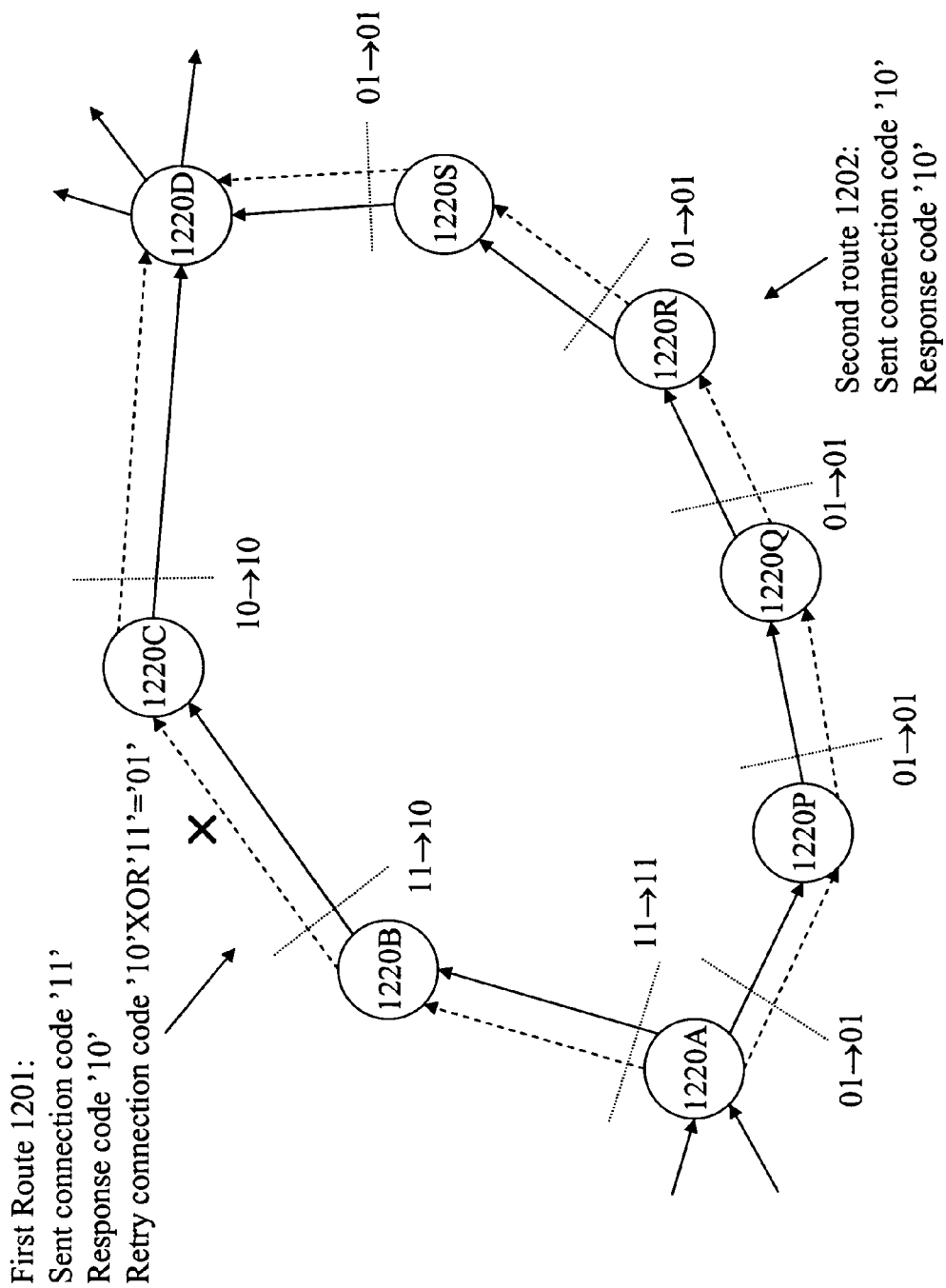

FIG. 15 illustrates a further example of the route-selection procedure. The connection code is initialized to '11' as in the example of FIG. 11. The operating connection succeeds along the first route 1201 but the phantom connection fails. Node 1220A then receives a response code of '10' from node 1220B and performs a bit-wise XOR operation of the response code '10' it receives and the connection code, '11', it has send along route 1201, to yield a new connection code (retry code) of '01'. The connection request is then directed to the second route 1202 and succeeds along the path from node 1220A to 1220S. The request to accommodate the phantom connection is therefore accepted along the second route 1202 and the connection code '01' is not modified at any node along the second route 1202. Source node 1220A then receives a response code of '01' from node 1220S and determines that the received response code and the connection code it has sent along the second route are equal and, hence, the connection-routing procedure is complete.

Figure 16:
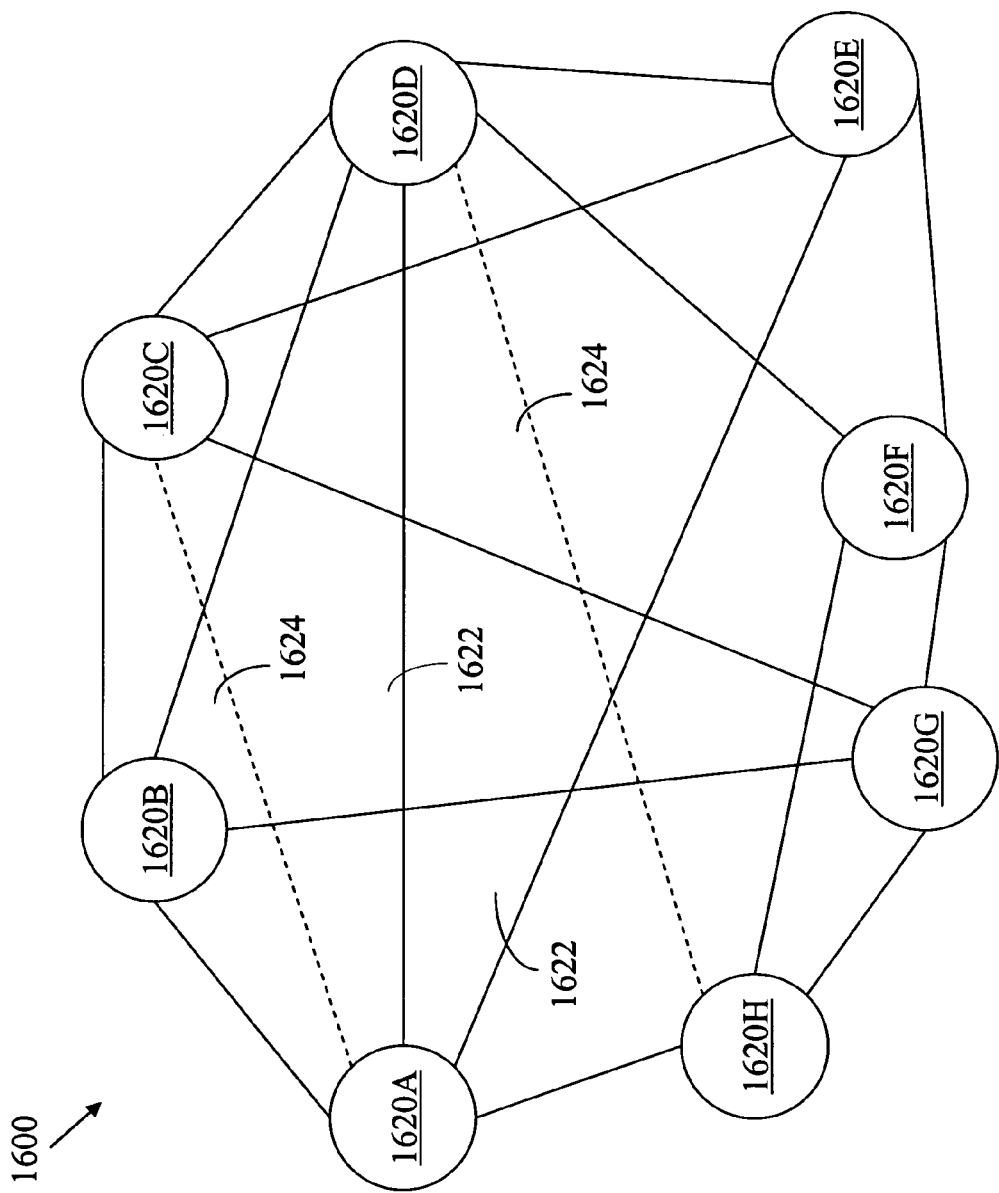
FIG. 16 illustrates the introduction of phantom links in a network of eight operating nodes for use with an embodiment of the present invention.

FIG. 16 illustrates an operating network 1600 comprising a relatively small number of nodes 1620, referenced as 1620A to 1620H interconnected by operating links 1622. Two additional links 1624 are scheduled for future introduction in network 1600. The new links may be treated as links each having a current operating capacity of zero and a prescribed future attainable capacity (phantom capacity) greater than zero. A route traversing a link scheduled for future inclusion in a network may be assigned an operating capacity of zero and considered unavailable for an operating-connection setup.

Figure 17:
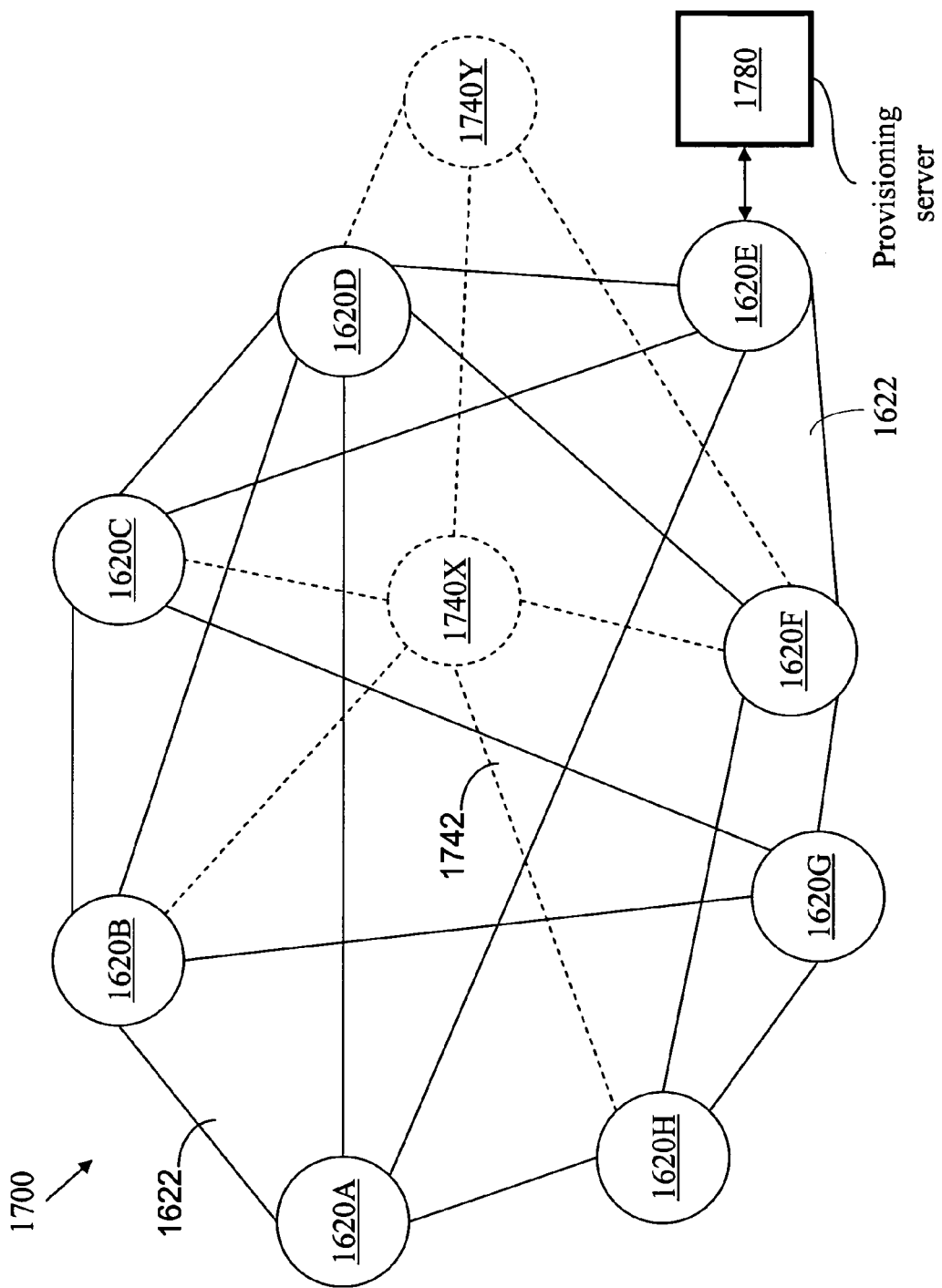
FIG. 17 illustrates the introduction of two phantom nodes and a provisioning server in the network of FIG. 16 in accordance with an embodiment of the present invention.

FIG. 17 illustrates a network 1700 which includes the operating nodes 1620A, 1620B, 1620C, 1620D, 1620E, 1620F, 1620G, and 1620H of network 1600, interconnected by operating links 1622. Two nodes 1740X and 1740Y are scheduled for future inclusion in the network. The two nodes 1740X and 1740Y are treated as phantom nodes and the links 1742 connecting each of them to the other and to operating nodes 1720 are called phantom links. Network 1700 includes a provisioning server 1780 connected to node 1620E to be used for computing the capacity requirements of the phantom links of the phantom network resulting from the inclusion of the two new nodes 1740X and 1740Y.

Node Controller

Each node has a controller operable to associate an operating capacity, a phantom capacity, an operating vacancy, and a phantom vacancy with each of its output links as illustrated in FIG. 4 for node 420. A source node (an edge node) may receive a succession of connection requests each connection request indicating a sink node (an edge node) and a specified flow-rate allocation. The source node selects a candidate route leading to the sink node and sends a current two-digit connection code along the candidate route. The current connection code may be modified at successive nodes traversed by the candidate route. In one embodiment, a node controller at each node along the candidate route modifies the connection code according to the operating vacancy, phantom vacancy, and the specified flow rate as described above with reference to FIGS. 9 to 15. The modified connection code is eventually returned to the source node as a response code. The node controller may further be operable to retain statistical data of the phantom vacancy record.

Figure 18:
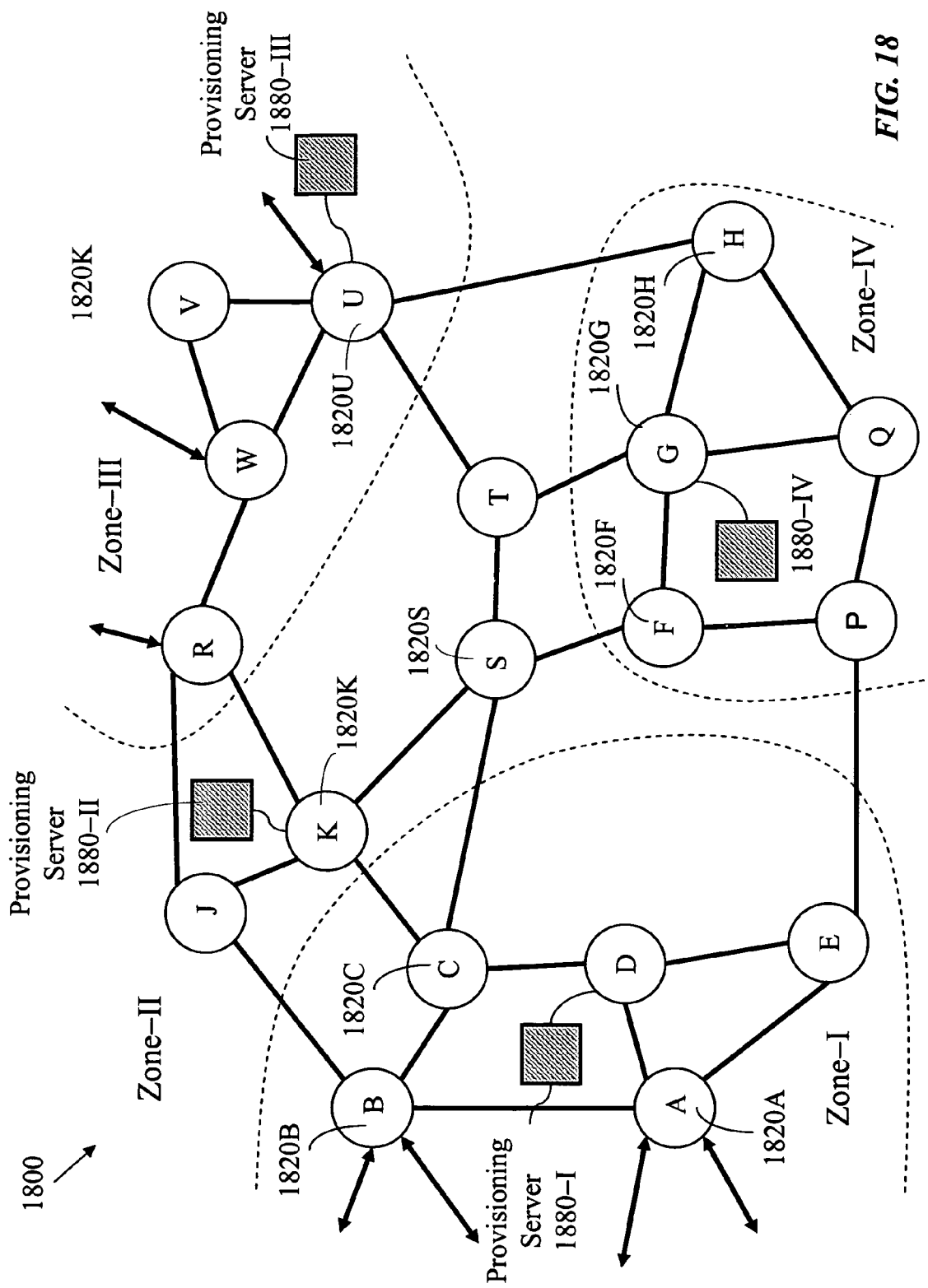
FIG. 18 illustrates a network partitioned into four zones each zone having a provisioning server in accordance with an embodiment of the present invention.

FIG. 18 illustrates an operating network logically divided into four zones, labeled zone-I, zone-II, zone-III, and zone-IV, for provisioning purposes. Each zone has a subset of nodes 1820 and a provisioning server 1880 associated with the subset of nodes. Zone-I includes operating nodes 1820A, 1820B, 1820C, 1820D, and 1820E. Zone-II includes nodes 1820J, 1820K, 1820S, and 1820T. Zone-III includes nodes 1820R, 1820U, 1820V, and 1820W. Zone-IV includes nodes 1820P, 1820Q, 1820F, 1820G, and 1820H. A provisioning server 1880-I is associated with zone-I and is supported by node 1820D. A provisioning server 1880-II is associated with zone-II and is supported by node 1820K. A provisioning server 1880-III is associated with zone-III and is supported by node 1820U. A provisioning server 1880-IV is associated with zone-IV and is supported by node 1820G. In FIG. 18, some nodes are identified merely by the suffixes of their reference numerals for clarity of the illustration; for example a node identified as E is node 1820E.

The logical partitioning of a network into zones for control purposes, and the selection of nodes to accommodate provisioning servers are preferably determined according to topological considerations and expected spatial-traffic-distribution patterns.

Figure 19:
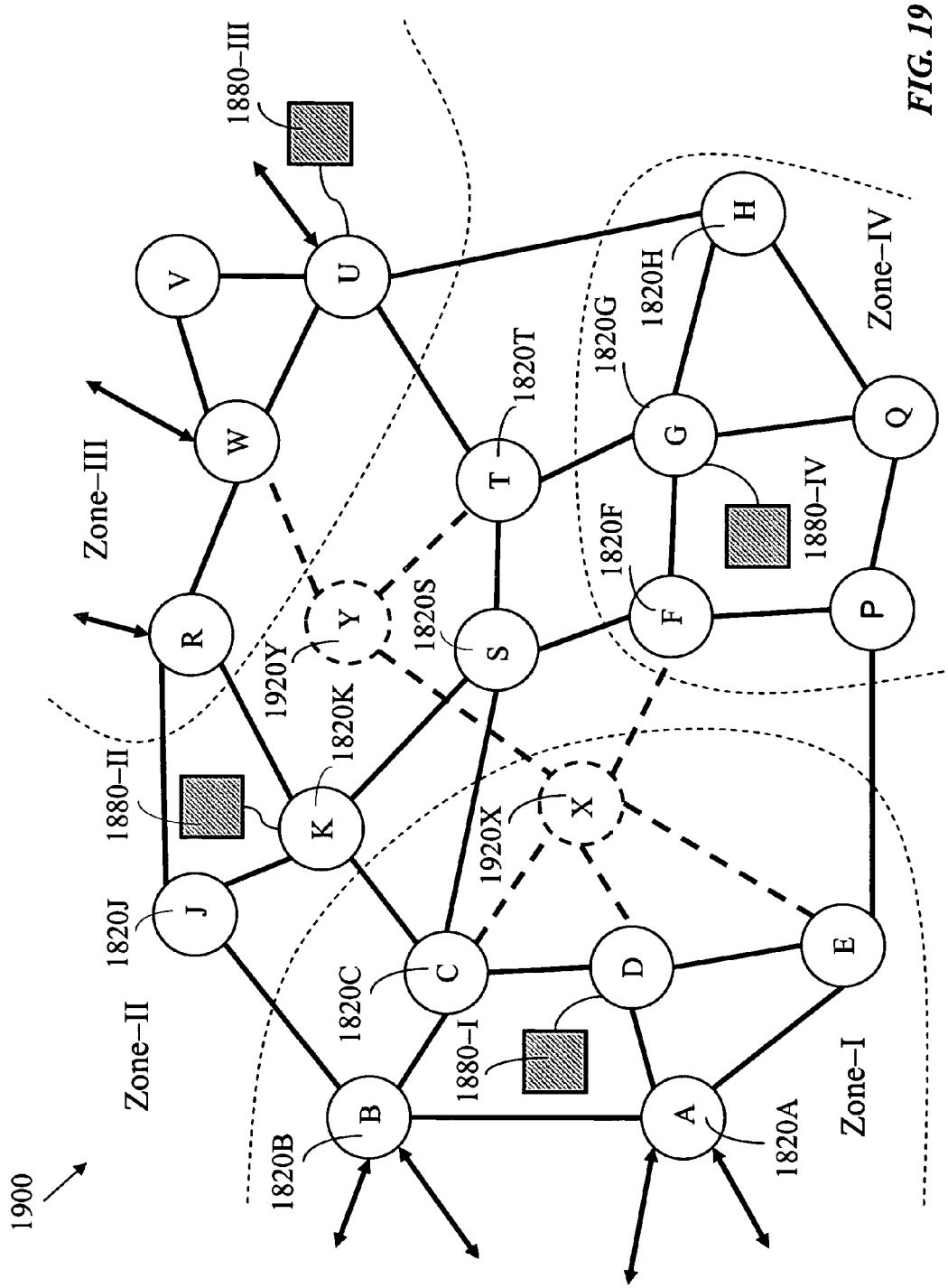
FIG. 19 illustrates the introduction of two phantom nodes in the network of FIG. 18 in accordance with an embodiment of the present invention.

FIG. 19 illustrates the network of FIG. 18 with the addition of two phantom nodes (planned nodes) 1920X and 1920Y associated with zone-I and zone-II, respectively. Phantom node 1920X, associated with zone-I, is linked to nodes 1820C, 1820D, and 1820E of zone-I, node 1920Y of zone-II, and 1820F of zone-IV. Phantom node 1920Y, associated with zone-II, is linked to nodes 1920X of zone-I, node 1820T of zone-II, and node 1820W of zone-III. Each link connecting to a phantom node is a phantom link and is illustrated by dashed lines in FIG. 19. A route set from a source node to a sink node may traverse operating links, phantom links, or a combination of operating links and phantom links.

Preferably, in network 1900 of FIG. 19, an operating connection is setup and a phantom connection setup are performed separately. An operating connection setup proceeds by selecting the first route in a respective route set that has a sufficient vacancy to accommodate a flow-rate specified by the connection request. If an operating connection is successfully setup, a phantom connection setup is established with the help of the provisioning servers 1880 (1880-I to 1880-IV).

Establishing an operating connection along a route traversing existing nodes can be performed by communication between controllers of successive nodes along the route. Establishing a connection traversing phantom nodes may be enabled using at least one provisioning server. A candidate route may be divided into route segments each belonging to one of the network zones defined by the associated provisioning server. A request for flow-rate allocation along a candidate route having two or more segments may be sent concurrently to respective provisioning servers. Alternatively, the request is forwarded by the source node to a first provisioning server and the request is successively forwarded from one provisioning server to a subsequent provisioning server in a predetermined order.

Figure 20:
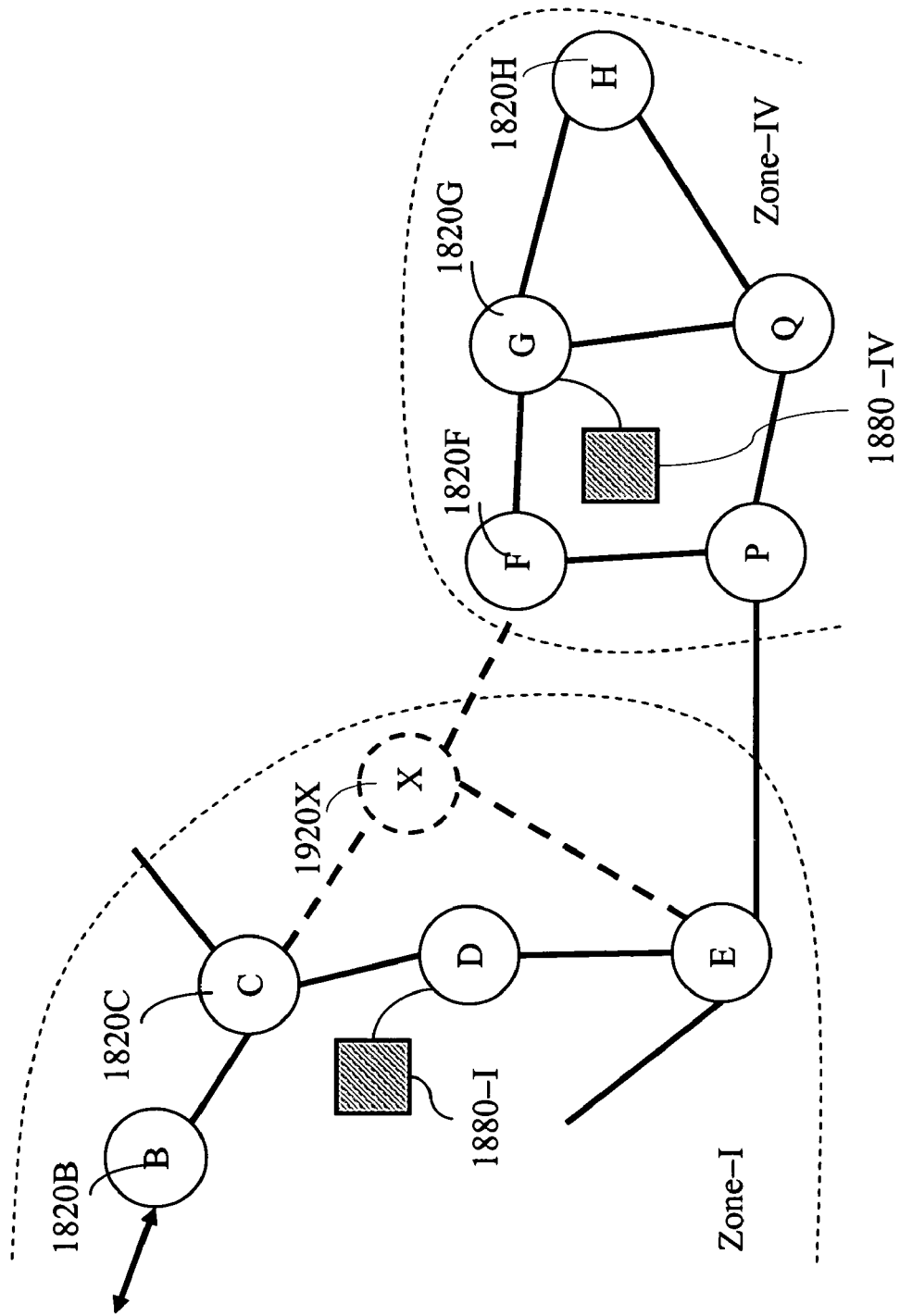
FIG. 20 illustrates a route traversing a phantom node in the network of FIG. 19.

Consider, for example, a route from node 1820B to 1820H in network 1900 and traversing nodes 1820C, 1920X, 1820F, and 1820G, as illustrated in FIG. 20. The route may be identified as route 'B-C-X-F-G-H'. The first three nodes 1820B, 1820C, and 1920X are in zone-I and the remaining nodes along the route are in zone-IV. A phantom connection setup may then be attempted by sending a connection request from source node 1820B to zone-I provisioning server 1880-I and to zone-IV provisioning server 1880-IV. The two provisioning servers 1880-I and 1880-IV may operate concurrently to setup a connection. If one of the two provisioning servers fails to find sufficient vacancy, another candidate route, if any, may be attempted. Alternatively, a flow-rate-allocation request may be sent to the provisioning server 1880-IV only if the first provisioning server 1880-I successfully allocates the required flow rate in the segment of the candidate route within zone-I.

Figure 21:
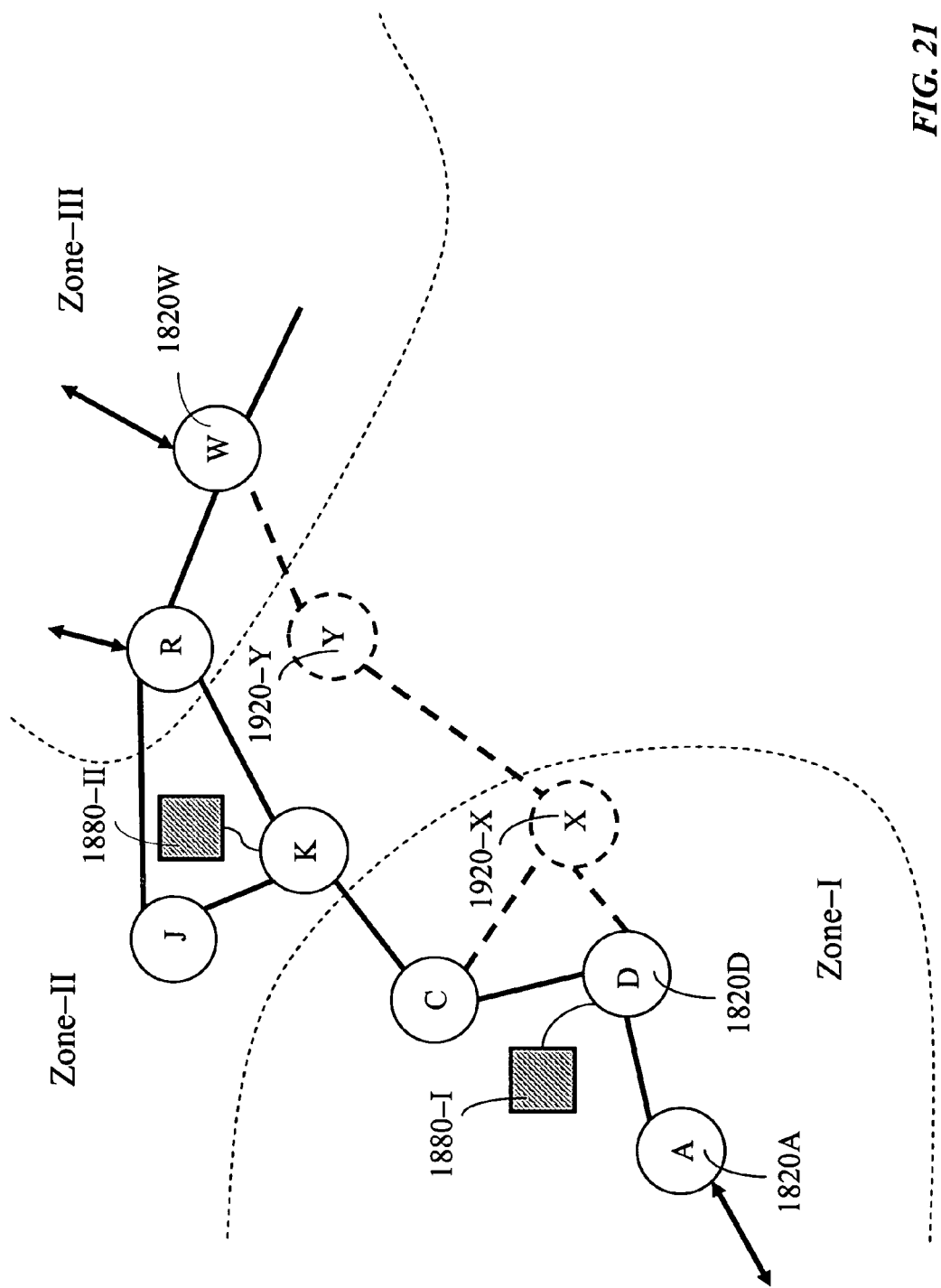
FIG. 21 illustrates a route traversing two phantom nodes in the network of FIG. 19.

FIG. 21 illustrates a route from node 1820A to 1820W. The route traverses operating nodes 1820D, 1820C, 1820K and 1820R through corresponding operating links. A phantom connection setup may traverse operating node 1820D then phantom nodes 1920X and 1920Y. Capacity and vacancy information related to phantom links D-X and X-Y would be maintained by provisioning server 1880-I while capacity and vacancy information related to phantom link Y-W would be maintained by provisioning server 1880-II.

Each provisioning server 1880 maintains capacity and vacancy records for each link emanating from a node belonging to the zone served by the provisioning server. FIG. 22 illustrates records 2200 maintained by provisioning server 1880-II of the phantom capacity and phantom vacancy of each link emanating from each node associated with zone-II of network 1900. Zone-II includes nodes 1820J, 1820K, 1820S, 1820T, and 1920Y (indicated as J, K, S, T, and Y) and indicated in field 2210 in FIG. 22. For each node, the phantom capacity and vacancy of each link to another node is indicated. For example, source node 1820J has links to sink nodes 1820B, 1820R, and 1820K. The sink nodes are referenced by the numeral 2220 in FIG. 22. The link capacities 2230 are denoted $\chi_B$, $\chi_R$, and $\chi_K$, respectively and the time-varying link vacancies 2240 are denoted $\theta_B$, $\theta_R$, and $\theta_K$, respectively. The capacity records for the remaining nodes of zone-II are likewise structured.

Thus, the network 1900 of FIG. 19 combines the operating network 1800 of FIG. 18 with new phantom nodes 1920 scheduled for future inclusion in the operating network 1800. Network 1800 comprises operating nodes 1820, operating links interconnecting the operating nodes, and a number of provisioning servers 1880. Each provisioning server is associated with a network zone and is operable to maintain an image of phantom links in the associated network zone. A network zone includes a subset of the operating nodes and a subset of phantom nodes scheduled for inclusion in the operating network. The image consists of records of phantom capacity and phantom vacancy for each link in the zone associated with the provisioning server. A provisioning server 1880 receives flow-rate-allocation requirements for specified phantom links, determines the availability of sufficient vacancy to allocate the flow-rate-allocation requirements, and maintains utilization data of the phantom links. The specified phantom links belong to a segment of a route, from a source node to a sink node, that traverses the network zone associated with the provisioning server. The utilization of a link is determined from the link's capacity and aggregated vacancy records. Recall that an operating link in the operating network 1800 may be assigned a phantom capacity (an attainable capacity) and be viewed as a phantom link in the phantom network 1900.

Each operating node is operable to receive connection requests each specifying a sink node and a flow-rate requirement. At least one of the operating nodes 1820 in network 1900 is operable to identify provisioning servers 1880 in network 1900 that maintain images of at least one phantom link of the specified phantom links of the route segment, and communicate the flow-rate requirement and identifiers of the at least one phantom link to at least the provisioning server associated with the first of the at least one phantom link.

Each of the provisioning servers is further operable to ascertain the availability of sufficient vacancy in the specified phantom links in its associated network zone and forward a description of the phantom route and the flow-rate requirement to a subsequent provisioning server if sufficient vacancy is ascertained. A provisioning server may send a rejection message to a respective source node if sufficient vacancy is not available. Each provisioning server is further operable to determine a target capacity of the each operating link based on the cumulative statistical distributions of link occupancy.

An operating connection may be terminated by its source node. The source node may send a connection-release request along the operating route of the connection. If a phantom route has also been assigned to the connection, i.e., if the operating connection is accompanied by a phantom connection, a connection release request may also be sent along the phantom route. The operating route and the phantom route may be coincident, in which case only one connection release request need be sent. When an operating connection is terminated by the source node or otherwise, all associated resources (allocated flow rate) are released and the operating vacancy records (or occupancy records) of respective links are updated.

A source node may also request a flow-rate adjustment, an increment or a decrement, for a given dual connection. A flow-rate increment is preferably provided along the existing operating route and along the phantom route, if any. A flow-rate adjustment requires updating operating-vacancy records and, if applicable, phantom-vacancy records.

Figure 23:
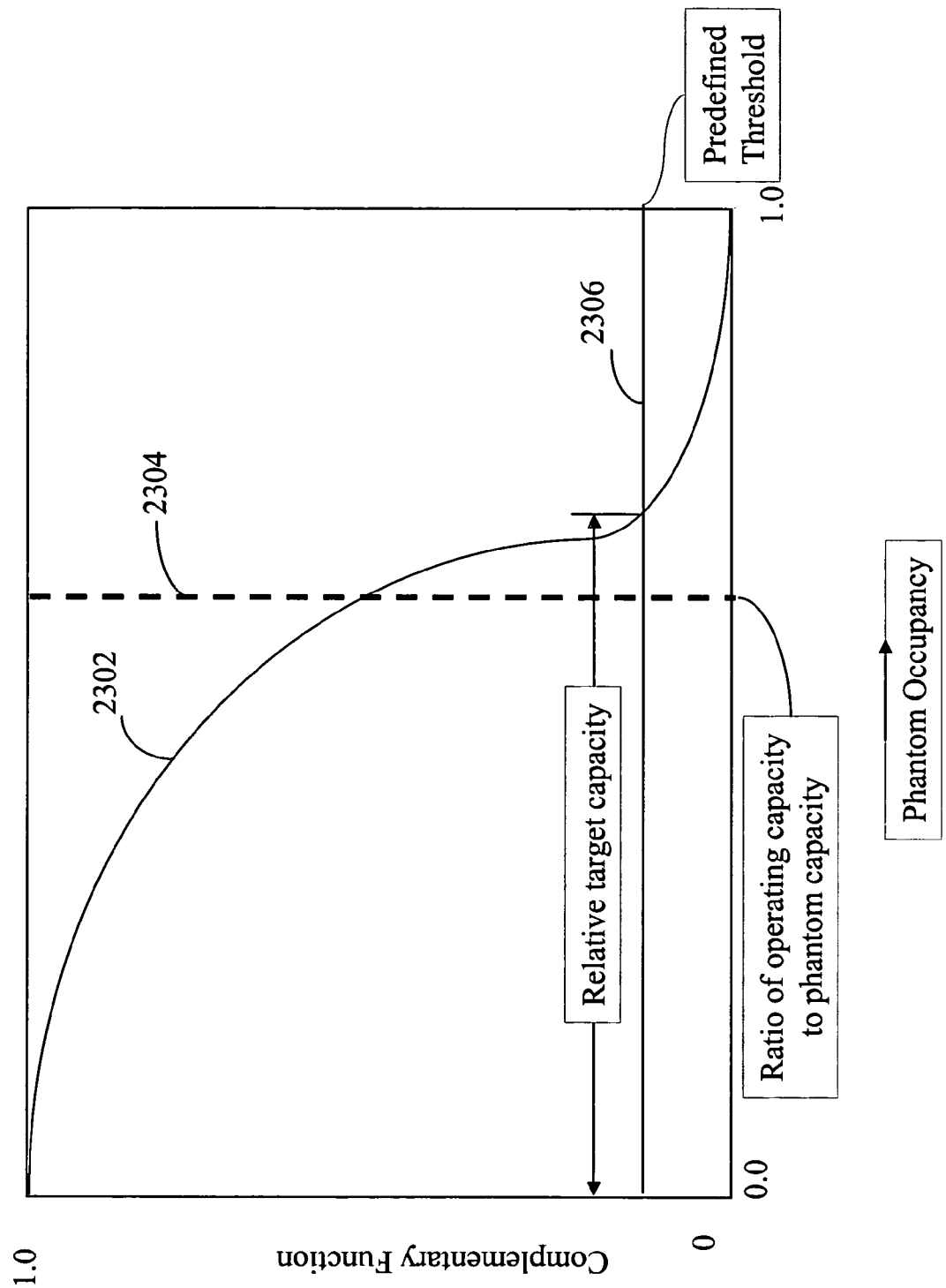
FIG. 23 illustrates the use of a complementary-distribution function and a pre-defined threshold of the complementary function to determine capacity requirement in accordance with an embodiment of the present invention.

FIG. 23 illustrates the complementary distribution function 2302 of the phantom occupancy of a link. The complementary distribution function 2302 of a link indicates the probability of exceeding a given phantom occupancy. It is calculated from multiple phantom-occupancy records of the link, as determined during the routing process of each connection request and sampled over a period of time. When the probability of exceeding the actual link-capacity is determined to be higher than a pre-defined threshold, the link-capacity must be increased. Each node controllers may convert phantom vacancy records to phantom occupancy records; one being the capacity complement of the other. Alternatively, each provisioning server may convert phantom vacancy records into phantom occupancy records to be used for computing target capacities.

In the example of FIG. 23, the operating capacity of a link under consideration is smaller than the associated phantom capacity and is indicated as a ratio to the phantom capacity. The phantom occupancy of the link exceeds the relative operating capacity 2304 of the link with a high probability. A target capacity of the link, which is exceeded with a negligible probability, is determined by the intersection of the complementary distribution function 2302 and the performance threshold line 2306. An adequate value of the threshold would be of the order of 0.01. The target capacity indicated in FIG. 23 is expressed as a relative value, being the ratio of the absolute target capacity to the phantom capacity. The target capacity in this case is lower than the phantom capacity. As described earlier, a phantom network at a given time may be intended to be the operating network at a future time.

The link capacity may be standardized to assume discrete values. The capacities determined based on the cumulative statistical distribution of occupancy (or vacancy) may be rounded, or rounded-up, to the nearest permissible discrete value (modular value).

It is noted that phantom occupancy statistics are only retained when both an operating connection and a phantom connection are established. When a phantom connection fails while the associated operating connection succeeds, statistics of the blocking incidence of phantom connection requests are recorded and related phantom occupancy statistics are not applicable.

Network Rearrangement

A phantom network may be a rearrangement of the operating network necessitating changes such as:
(a) modifying an existing operating link by increasing or decreasing the link's capacity;
(b) addition of new links;
(c) addition of new nodes;
(d) deletion of existing operating links; or
(e) deletion of operating nodes.

The modified links, new links, and new nodes are treated as phantom links and phantom nodes by the provisioning system associated with the operating network as described earlier.

The phantom route set for any node pair does not include any route that traverses a deleted link or deleted node. If the phantom network does not include new nodes, a common route set for each edge-node pair may be used as an operating route set and a phantom route set as described with reference to FIGS. 9 to 11. Thus, an operating route in an operating route set and a phantom route in a phantom route set may traverse the same links with each link having an operating capacity and a phantom capacity. If an operating link is scheduled to be deleted, a common route set may still be used with each phantom route traversing a deleted link marked as unavailable. Naturally, when an operating node is deleted, its entire operating links are also deleted.

Phantom Network with Additional Edge Nodes

The phantom network considered so far comprises edge nodes of a current operating network as well as other nodes of the operating network and planned new nodes (phantom nodes). The edge nodes are those nodes that serve traffic sources and sinks as described earlier. The planned new nodes would be introduced to provide new routes that improve network efficiency. The procedure described above with reference to FIGS. 9 to 15 does not cover the case where new edge nodes, supporting new traffic sources and sinks, are introduced. It is assumed that such new edge nodes would initially be connected to other nodes through links the capacities of which would be estimated by other means to be refined later when the new edge nodes become operational and vacancy statistics are collected in accordance with the procedures of the present invention.

Embedded Network

The self-provisioning network may be a network embedded in a parent network. A parent network may be shared by several embedded networks each having its own control system. An embedded network may be assigned a dynamic share of the parent network, and the dynamic share of the parent network may be determined using the methods described in this disclosure.

The self-provisioning method described in the present disclosure can be applied to real-time allocation of capacity. The fixed capacity of a physical link from a node can be allocated to data flows directed to various destination nodes through a cross-connector. Each capacity allocation to each of the destination nodes may be viewed as a virtual link of adaptive capacity. The operating capacity of a virtual link corresponds to its current capacity allocation. The phantom capacity of the virtual link is its attainable capacity in a subsequent capacity-allocation cycle. A capacity allocation not exceeding the phantom capacity of a virtual link may become the virtual link's capacity allocation in a subsequent capacity-allocation cycle.

Other modifications will be apparent to those skilled in the art and, therefore, the invention is defined in the claims.

What is claimed is:

1. A self-provisioning operating network comprising:
   a plurality of operating nodes;
   a set of operating links interconnecting said operating nodes; and
   a provisioning server communicatively coupled to at least one of the operating nodes and maintaining an image of a set of phantom links emanating from a subset of the operating nodes, said image including a phantom capacity and a phantom vacancy for each phantom link;
   wherein an originating node from among said plurality of operating nodes:
      receives a connection request, from a data source, specifying a sink node from among said operating nodes and a flow-rate requirement;
      selects an operating route to the sink node, the operating route traversing a subset of the operating links;
      selects a phantom route to the sink node, the phantom route traversing a subset of the phantom links; and
      communicates the flow-rate requirement and identifiers of the subset of phantom links to the provisioning server;
   wherein the provisioning server allocates the flow-rate requirement and maintains utilization data of each phantom link, the utilization data determined as the difference between said phantom capacity and said phantom vacancy.

2. The self-provisioning operating network of claim 1 wherein said provisioning server further determines cumulative statistical distributions of said utilization data of each of said phantom links.

3. The self-provisioning operating network of claim 2 wherein said provisioning server further determines a target capacity for each phantom link of said set of phantom links based on said cumulative statistical distributions.

4. The self-provisioning operating network of claim 1 wherein said provisioning server:
   ascertains availability of sufficient vacancy in each phantom link of said subset of the phantom links; and sends a rejection message to said originating node if sufficient vacancy is not available.

5. In an operating network having a first set of nodes interconnected by a first set of links where selected nodes of said first set of nodes support traffic sources and sinks, a method of self-provisioning comprising steps of:
creating an image of a phantom network said phantom network comprising a second set of nodes interconnected by a second set of links wherein said second set of nodes includes a subset of said first set of nodes;
receiving connection requests at said selected nodes, each connection request specifying a source node, a sink node, and a flow-rate-allocation requirement, both said source node and said sink node belonging to said selected nodes;
executing, for said each connection request, an operating-connection-setup process for an operating connection through said operating network;
performing, for each successful operating-connection setup, a phantom-connection setup process for a phantom connection through said phantom network;
maintaining occupancy records of each link in said second set of links traversed by said phantom connection; and
determining a target capacity for each link in said second set of links based on said occupancy records.

6. The method of claim 5 wherein said performing is based on associating a phantom capacity with each link of said second set of links.

7. The method of claim 6 further comprising a step of determining a plurality of phantom route sets, each phantom route set comprising a number of phantom routes from one node of said selected nodes to another node of said selected nodes, wherein at least one phantom route set includes a phantom route traversing at least one of said phantom nodes.

8. The method of claim 7 wherein said performing comprises a step of selecting a route from a respective phantom route set, from among said plurality of phantom route sets designated for said source node and said sink node.

9. The method of claim 5 further comprising a step of determining a plurality of operating route sets, each operating route set comprising a number of operating routes from one node of said selected nodes to another node of said selected nodes, each operating route traversing at least one of said operating links.

10. The method of claim 9 wherein said executing comprises a step of selecting an operating route from a respective operating route set, from among said plurality of operating route sets, designated for said source node and said sink node.

11. The method of claim 5 wherein said second set of nodes further includes a set of phantom nodes considered for future inclusion in said operating network.

12. The method of claim 5 further comprising a step of receiving a connection-release request and releasing said operating connection and said phantom connection.

13. The method of claim 5 wherein said target capacity is ascertained by determining a respective statistical complementary function of said occupancy records for said each link in said second set of links and selecting said target capacity to correspond to a value of an occupancy record exceeded with a prescribed probability.

14. A method of network self-provisioning, the network comprising nodes interconnected by links, the method comprising steps of:
associating with each link an operating capacity, a phantom capacity, an operating vacancy, and a phantom vacancy;
receiving at each of selected nodes a succession of connection requests each connection request indicating a sink node and a specified flow rate;
seeking for said each connection request an operating route and a phantom route to said sink node, said operating route having an operating vacancy at least equal to said specified flow rate and said phantom route having a phantom vacancy at least equal to said specified flow rate;
abandoning said phantom route if said operating route is not found;
recording utilization of the phantom capacity of each link traversed by said phantom route; and
determining a target capacity for each of said links based on said utilization.

15. The method of claim 14 wherein said seeking comprises steps of
associating with said each connection request a current connection request code of two digits initialized as '11';
setting a response code to equal said current connection request code;
sending said each connection request along a candidate route and at each node along said candidate route preceding said sink node:
setting the first digit of said response code to '0' when said specified flow rate exceeds the operating vacancy of the succeeding link;
setting the second digit of said response code to '0' when said specified flow rate exceeds the phantom vacancy of the succeeding link; and
abandoning said candidate route if said response code attains a value of '00';
indicating a successful result of said seeking if said response code equals said current connection request code; and
repeating said seeking if said response code differs from said current connection request code.

16. The method of claim 15 wherein said repeating includes a step of determining a new connection request code as the Exclusive OR function of said current connection request code and said response code.

17. The method of claim 15 wherein said candidate route is selected from a route set comprising metric-optimized routes from said each of selected nodes to said sink node.

18. The method of claim 14 including the further step of associating an operating capacity of zero and a predefined phantom capacity to at least one of said links.

19. The method of claim 14 wherein said network is embedded in a higher-capacity parent network and said phantom capacity is determined by said parent network.

20. A method of network self-provisioning, the network comprising operating nodes, interconnected by operating links and phantom links, and phantom nodes connecting to each other and to said operating nodes by phantom links, the method comprising steps of:
associating with each operating link an operating capacity, a phantom capacity, an operating vacancy, and a phantom vacancy;
associating with each phantom link a phantom capacity and a phantom vacancy;
associating with each phantom link an operating capacity equal to zero;
determining a route set for each of selected pairs of operating nodes;
receiving at selected operating nodes a succession of connection requests each connection request indicating a sink node and a specified flow rate;

seeking for said each connection request an operating route having a sufficient operating vacancy and a phantom route having a sufficient phantom vacancy;

abandoning said phantom route if said operating route is not found;

recording utilization of the phantom capacity of each link traversed by each said phantom route; and determining target-link capacity requirements based on said utilization.

21. The method of claim 20 wherein said route set includes at least one operating route and one phantom route traversing the same nodes.

22. The method of claim 20 including a further step of marking at least one route of said route set as unavailable for operating connections.

23. The method of claim 20 including a further step of marking at least one route of said route set as unavailable for phantom connections.

24. In a network comprising a plurality of nodes and a plurality of links interconnecting said nodes,
a distributed provisioning system comprising:
a set of provisioning servers each provisioning server allocated to a respective subset of nodes from among the plurality of nodes and connected to a selected node of the respective subset of nodes, said each provisional server:
maintains an image of a set of phantom links emanating from the respective subset of the nodes;
receives from the plurality of nodes, through the selected node, flow-rate-allocation requirements for the set of phantom links;
determines availability of sufficient vacancy in the set of phantom links for the flow-rate-allocation requirements;
maintains utilization data of the set of phantom links;
determines a cumulative statistical distribution of said utilization data;
determines target capacities of the set of phantom links according to said cumulative statistical distribution and a predefined probability threshold; and
communicates an indication of said availability to another provisioning server in said network.

25. A method of self-provisioning of a network having a plurality of nodes interconnected by a plurality of links, the method comprising steps of:

associating an operating capacity and a phantom capacity with each link of said plurality of links;

associating an operating-vacancy record with said operating capacity and a phantom-vacancy record with said phantom capacity;

designating a plurality of route sets each route set comprising at least one route from a respective node to each other node;

receiving connection requests each specifying a source node from among said plurality of nodes, a sink node from among said plurality of nodes, and a flow-rate requirement, and for each connection request:
identifying a corresponding route set;
selecting an operating route, from said corresponding route set, traversing links each of which having an operating vacancy exceeding the flow-rate requirement; and
selecting a phantom route, from said corresponding route set, traversing links each of which having a phantom vacancy exceeding the specified flow-rate requirement;

recording, at each node, values of phantom-vacancy of each emanating link from said each node to produce phantom-vacancy samples;

determining utilization statistics, based on said phantom vacancy samples, for said each emanating link; and reporting said utilization statistics to a provisioning server communicatively coupled to said network.

26. The method of claim 25 wherein the routes in said each route set are sorted according to a merit criterion.

27. The method of claim 25 wherein the routes in said each route set are grouped into route bands, said route bands classified according to a merit criterion.

28. The method of claim 25 further including steps of:
receiving a release request specifying a release flow-rate, an operating route, and an associated phantom route;
increasing an operating-vacancy record of each link in said operating route by said release flow rate; and
increasing a phantom-vacancy record of each link in said phantom route by said release flow rate.

* * * * *